US007053895B2

United States Patent
Yamagata et al.

(10) Patent No.: US 7,053,895 B2
(45) Date of Patent: May 30, 2006

(54) IMAGE PROCESSING APPARATUS, IMAGE PROCESSING METHOD, CONTROL PROGRAM AND RECORDING MEDIUM

(75) Inventors: Shigeo Yamagata, Kanagawa (JP); Hiroshi Tanioka, Shizuoka (JP); Manabu Takebayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 10/331,550

(22) Filed: Dec. 31, 2002

(65) Prior Publication Data
US 2003/0132940 A1    Jul. 17, 2003

(30) Foreign Application Priority Data
Jan. 15, 2002    (JP)    ............................. 2002-006025

(51) Int. Cl.
*G06T 15/00*    (2006.01)

(52) U.S. Cl. ........................ 345/428; 345/419; 712/10; 706/41

(58) Field of Classification Search ................ 345/419, 345/428; 712/10, 16; 706/41
See application file for complete search history.

(56) References Cited

U.S. PATENT DOCUMENTS

| 6,067,088 | A | 5/2000 | Tanioka et al. ............. 345/428 |
| 6,339,819 | B1* | 1/2002 | Huppenthal et al. .......... 712/16 |
| 6,405,185 | B1* | 6/2002 | Pechanek et al. ............. 706/41 |
| 6,460,127 | B1* | 10/2002 | Akerib ........................ 712/10 |

FOREIGN PATENT DOCUMENTS

JP    2001-274993    10/2001

* cited by examiner

*Primary Examiner*—Phu K. Nguyen
(74) *Attorney, Agent, or Firm*—Fitzpatrick, Cella, Harper & Scinto

(57) ABSTRACT

An image processing apparatus which processes input image data of Y lines, each consisting of X pixels, using an SIMD processor, comprises a calculation unit including N (X>N>1, Y>N>1) elemental processors capable of parallel-operating; an input unit for dividing and inputting the image data of one line with respect to every N pixels; a storage for storing the input N-pixel image data of the N lines; and an image processor for supplying, from among the stored N-pixel image data of the N lines, the N image data respectively to the N elemental processors, and causing the respective elemental processors to perform the same-kind calculations in parallel. Thus, the image processing apparatus for performing an image process such as error diffusion by using the SIMD processor without using any auxiliary processor for a sequential process can be provided.

31 Claims, 28 Drawing Sheets

FIG. 5

IMAGE SIGNAL → MAIN SCAN DIRECTION

SUB SCAN DIRECTION ↓

| (0,0) | (0,1) | (0,2) | -------- | (0,7166) | (0,7167) |
|---|---|---|---|---|---|
| (1,0) | (1,1) | (1,2) | | (1,7166) | (1,7167) |
| (2,0) | (2,1) | (2,2) | | (2,7166) | (2,7167) |
| (3,0) | (3,1) | (3,2) | | (3,7166) | (2,7167) |
| ⋮ | ⋮ | ⋮ | ⋮ | ⋮ | ⋮ |
| ⋮ | ⋮ | ⋮ | ⋮ | ⋮ | ⋮ |
| (4989,0) | (4989,1) | (4989,2) | | (4989,7166) | (4989,7167) |
| (4990,0) | (4989,1) | (4989,2) | | (4990,7166) | (4990,7167) |
| (4991,0) | (4989,1) | (4989,2) | | (4991,7166) | (4991,7167) |

FIG. 7

WORKING MEMORY LINE ADDRESS

| | | | | | | |
|---|---|---|---|---|---|---|
| 0 | (0,0) | (0,1) | (0,2) | --- | (0,126) | (0,127) |
| 1 | (0,128) | (0,129) | (0,130) | --- | (0,254) | (0,255) |
| 2 | (0,256) | (0,1) | (0,2) | --- | (0,126) | (0,383) |
| ⋮ | ⋮ | ⋮ | ⋮ | --- | ⋮ | ⋮ |
| 54 | (0,6912) | (0,6913) | (0,6914) | --- | (0,7038) | (0,7039) |
| 55 | (0,7040) | (0,7041) | (0,7042) | --- | (0,7166) | (0,7167) |
| 56 | (1,0) | (1,1) | (1,2) | --- | (1,126) | (1,127) |
| 57 | (1,128) | (1,129) | (1,130) | --- | (1,254) | (1,255) |
| 58 | (1,256) | (1,257) | (1,258) | --- | (1,382) | (1,383) |
| ⋮ | ⋮ | ⋮ | ⋮ | --- | ⋮ | ⋮ |
| 110 | (1,6912) | (1,6913) | (1,6914) | --- | (1,7038) | (1,7039) |
| 111 | (1,7040) | (1,7041) | (1,7042) | --- | (1,7166) | (1,7167) |
| ⋮ | ⋮ | ⋮ | ⋮ | ⋮ | ⋮ | ⋮ |
| 7112 | (127,0) | (127,1) | (127,2) | --- | (127,126) | (127,127) |
| 7113 | (127,128) | (127,129) | (127,130) | --- | (127,254) | (127,255) |
| 7114 | (127,256) | (127,257) | (127,258) | --- | (127,382) | (127,383) |
| ⋮ | ⋮ | ⋮ | ⋮ | --- | ⋮ | ⋮ |
| 7166 | (127,6912) | (127,6913) | (127,6914) | --- | (127,7038) | (127,7039) |
| 7167 | (127,7040) | (127,7041) | (127,7042) | --- | (127,7166) | (127,7167) |
| ⋮ | ⋮ | ⋮ | ⋮ | ⋮ | ⋮ | ⋮ |
| 279496 | (4991,0) | (4991,1) | (4991,2) | --- | (4991,126) | (4991,127) |
| 279497 | (4991,128) | (4991,129) | (4991,130) | --- | (4991,254) | (4991,255) |
| 279498 | (4991,256) | (4991,257) | (4991,258) | --- | (4991,382) | (4991,383) |
| ⋮ | ⋮ | ⋮ | ⋮ | --- | ⋮ | ⋮ |
| 279550 | (4991,6912) | (4991,6913) | (4991,6914) | --- | (4991,7038) | (4991,7039) |
| 279551 | (4991,7040) | (4991,7041) | (4991,7042) | --- | (4991,7166) | (4991,7167) |

Rows 0–55: 0-LINE DATA
Rows 56–111: 1-LINE DATA
Rows 7112–7167: 127-LINE DATA
Rows 279496–279551: 4991-LINE DATA

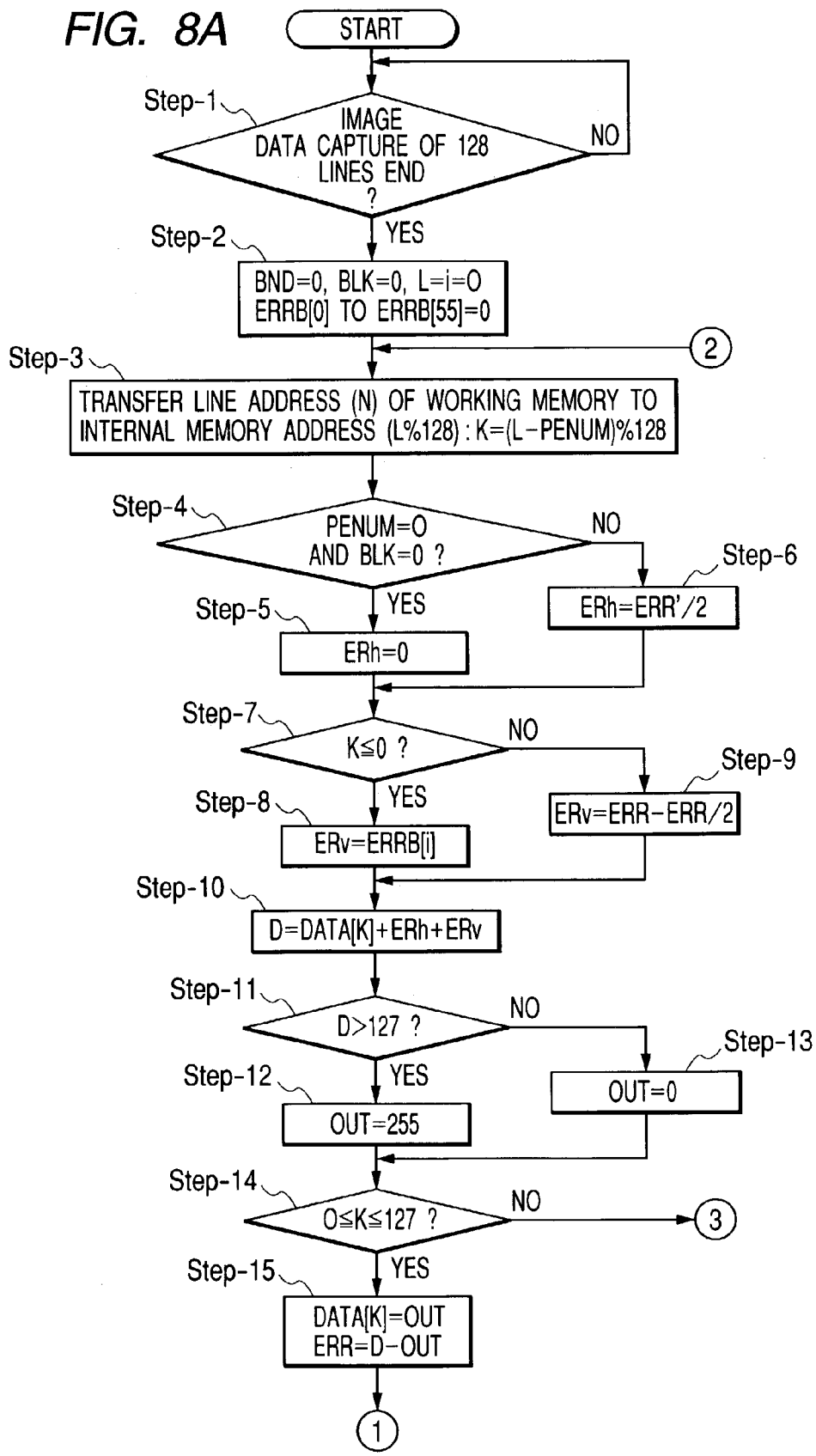

FIG. 9A – FIG. 9I

| L | | PE0 | PE1 | PE2 | ------ | PE126 | PE127 |
|---|---|---|---|---|---|---|---|
| 0 | K= | 0 | −1 | −2 | ------ | −126 | −127 |
| 1 | K= | 1 | 0 | −1 | ------ | −125 | −126 |
| 2 | K= | 2 | 1 | 0 | ------ | −124 | −125 |
| ⋮ | K= | ⋮ | ⋮ | ⋮ | ⋮ | ⋮ | ⋮ |
| ⋮ | K= | ⋮ | ⋮ | ⋮ | ⋮ | ⋮ | ⋮ |
| 127 | K= | 127 | 126 | 125 | ------ | 1 | 0 |
| 128 | K= | 0 | 127 | 126 | ------ | 2 | 1 |
| 129 | K= | 1 | 0 | 127 | ------ | 3 | 2 |
| ⋮ | K= | ⋮ | ⋮ | ⋮ | ⋮ | ⋮ | ⋮ |
| ⋮ | K= | ⋮ | ⋮ | ⋮ | ⋮ | ⋮ | ⋮ |
| 511 | K= | 127 | 126 | 125 | ------ | 1 | 0 |
| ⋮ | K= | ⋮ | ⋮ | ⋮ | ⋮ | ⋮ | ⋮ |
| ⋮ | K= | ⋮ | ⋮ | ⋮ | ⋮ | ⋮ | ⋮ |
| 7168 | K= | 0 | 127 | 126 | ------ | 2 | 1 |
| ⋮ | K= | ⋮ | ⋮ | ⋮ | ⋮ | ⋮ | ⋮ |
| 279551 | K= | 127 | 126 | 125 | ------ | 1 | 0 |
| ⋮ | K= | ⋮ | ⋮ | ⋮ | ⋮ | ⋮ | ⋮ |
| 279678 | K= | 126 | 125 | 124 | ------ | 0 | 127 |

MAIN SCAN DIRECTION
ERh=ERR/2
SUB SCAN DIRECTION
ERv=ERR−ERR/2
* : TARGET PIXEL POSITION

FIG. 14

| | | | | | | |
|---|---|---|---|---|---|---|
| 0 | (0,0) | (0,1) | (0,2) | --- | (0,126) | (0,127) |
| 1 | (1,0) | (1,1) | (1,2) | --- | (1,126) | (1,127) |
| 2 | (2,0) | (2,1) | (2,2) | --- | (2,126) | (2,127) |
| ⋮ | ⋮ | ⋮ | ⋮ | --- | ⋮ | ⋮ |
| 4991 | (4991,0) | (4991,1) | (4991,2) | --- | (4991,126) | (4991,127) |
| 4992 | (0,128) | (0,129) | (0,130) | --- | (0,254) | (0,255) |
| 4993 | (1,128) | (1,129) | (1,130) | --- | (1,254) | (1,255) |
| ⋮ | ⋮ | ⋮ | ⋮ | --- | ⋮ | ⋮ |
| 9983 | (4991,128) | (4991,129) | (4991,130) | --- | (4991,254) | (4991,255) |

⋮

| | | | | | | |
|---|---|---|---|---|---|---|
| 274560 | (0,7040) | (0,7041) | (0,7042) | --- | (0,7166) | (0,7167) |
| 274561 | (1,7040) | (1,7041) | (1,7042) | --- | (1,7166) | (1,7167) |
| ⋮ | ⋮ | ⋮ | ⋮ | --- | ⋮ | ⋮ |
| 279551 | (4991,7040) | (4991,7041) | (4991,7042) | --- | (4991,7166) | (4991,7167) |

MAIN SCAN DIRECTION

SUB SCAN DIRECTION

\* : TARGET PIXEL POSITION

FIG. 19

WORKING MEMORY LINE ADDRESS

| | | | | | | |
|---|---|---|---|---|---|---|
| 0 | (0,0) | (0,2) | (0,4) | --- | (0,252) | (0,254) |
| 1 | (0,1) | (0,3) | (0,5) | --- | (0,253) | (0,255) |
| 2 | (0,256) | (0,258) | (0,260) | --- | (0,508) | (0,510) |
| ⋮ | ⋮ | ⋮ | ⋮ | --- | ⋮ | ⋮ |
| 54 | (0,6912) | (0,6914) | (0,6916) | --- | (0,7164) | (0,7166) |
| 55 | (0,6913) | (0,6915) | (0,6917) | --- | (0,7165) | (0,7167) |
| 56 | (1,0) | (1,2) | (1,4) | --- | (1,252) | (1,254) |
| 57 | (1,1) | (1,3) | (1,5) | --- | (1,253) | (1,255) |
| 58 | (1,256) | (1,258) | (1,260) | --- | (1,508) | (1,510) |
| ⋮ | ⋮ | ⋮ | ⋮ | --- | ⋮ | ⋮ |
| 110 | (1,6912) | (1,6914) | (1,6916) | --- | (1,7164) | (1,7166) |
| 111 | (1,6913) | (1,6915) | (1,6917) | --- | (1,7165) | (1,7167) |
| ⋮ | ⋮ | ⋮ | ⋮ | ⋮ | ⋮ | ⋮ |
| 7112 | (127,0) | (127,2) | (127,4) | --- | (127,252) | (127,254) |
| 7113 | (127,1) | (127,3) | (127,5) | --- | (127,253) | (127,255) |
| 7114 | (127,256) | (127,258) | (127,260) | --- | (127,508) | (127,510) |
| ⋮ | ⋮ | ⋮ | ⋮ | --- | ⋮ | ⋮ |
| 7166 | (127,6912) | (127,6914) | (127,6916) | --- | (127,7164) | (127,7166) |
| 7167 | (127,6913) | (127,6915) | (127,6917) | --- | (127,7165) | (127,7167) |
| ⋮ | ⋮ | ⋮ | ⋮ | ⋮ | ⋮ | ⋮ |
| 279496 | (4991,0) | (4991,2) | (4991,4) | --- | (4991,252) | (4991,254) |
| 279497 | (4991,1) | (4991,3) | (4991,5) | --- | (4991,253) | (4991,255) |
| 279498 | (4991,256) | (4991,258) | (4991,260) | --- | (4991,508) | (4991,510) |
| ⋮ | ⋮ | ⋮ | ⋮ | --- | ⋮ | ⋮ |
| 279550 | (4991,6912) | (4991,6914) | (4991,6916) | --- | (4991,7164) | (4991,7166) |
| 279551 | (4991,6913) | (4991,6915) | (4991,6917) | --- | (4991,7165) | (4991,7167) |

- Rows 0–55: 0-LINE DATA
- Rows 56–111: 1-LINE DATA
- Rows 7112–7167: 127-LINE DATA
- Rows 279496–279551: 4991-LINE DATA

FIG. 21

|   | | 0 | 1 | 2 | ------- | 126 | 127 |
|---|---|---|---|---|---------|-----|-----|
| L | | PE0 | PE1 | PE2 | ------- | PE126 | PE127 |
| 0 | K= | 0 | -2 | -4 | ------- | -252 | -254 |
| 1 | K= | 1 | -1 | -3 | ------- | -251 | -253 |
| 2 | K= | 2 | 0 | -2 | ------- | -250 | -252 |
| ⋮ | K= | ⋮ | ⋮ | ⋮ | ------- | ⋮ | ⋮ |
| ⋮ | K= | ⋮ | ⋮ | ⋮ | ------- | ⋮ | ⋮ |
| 253 | K= | 253 | 251 | 249 | ------- | 1 | -1 |
| 254 | K= | 254 | 252 | 250 | ------- | 2 | 0 |
| 255 | K= | 255 | 253 | 251 | ------- | 3 | 1 |
| 256 | K= | 0 | 254 | 252 | ------- | 4 | 2 |
| ⋮ | K= | ⋮ | ⋮ | ⋮ | ------- | ⋮ | ⋮ |
| 511 | K= | 255 | 253 | 251 | ------- | 3 | 1 |
| 512 | K= | 0 | 254 | 252 | ------- | 4 | 2 |
| ⋮ | K= | ⋮ | ⋮ | ⋮ | ------- | ⋮ | ⋮ |
| 7167 | K= | 255 | 253 | 251 | ------- | 3 | 1 |
| 7168 | K= | 0 | 254 | 252 | ------- | 4 | 2 |
| 7169 | K= | 1 | 255 | 253 | ------- | 5 | 3 |
| ⋮ | K= | ⋮ | ⋮ | ⋮ | ------- | ⋮ | ⋮ |
| 279804 | K= | 252 | 250 | 248 | ------- | 0 | 254 |
| 279805 | K= | 253 | 251 | 249 | ------- | 1 | 255 |

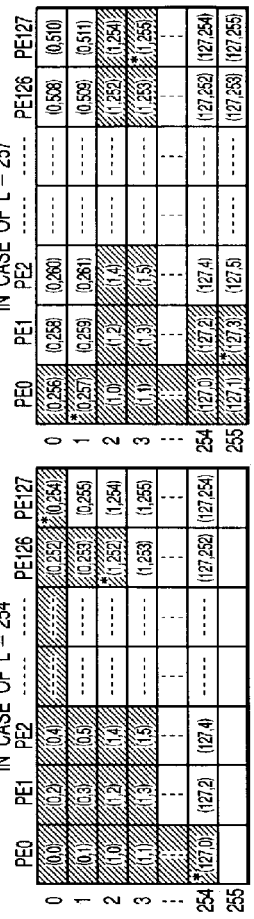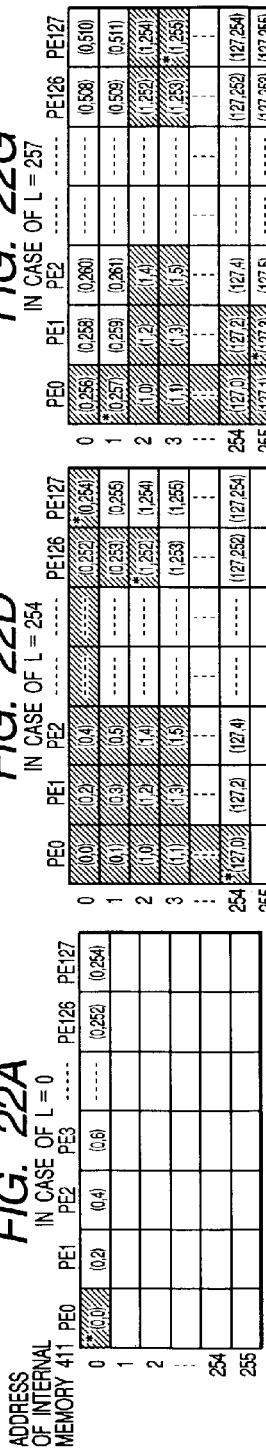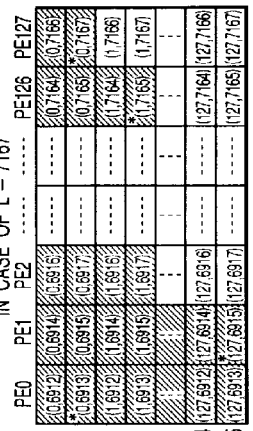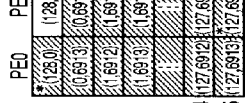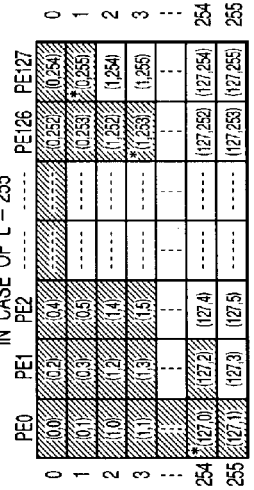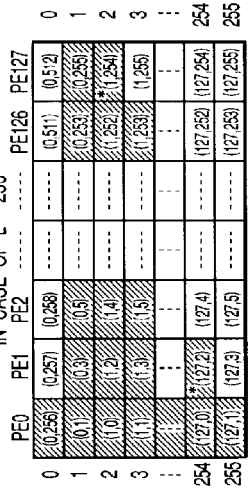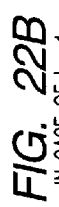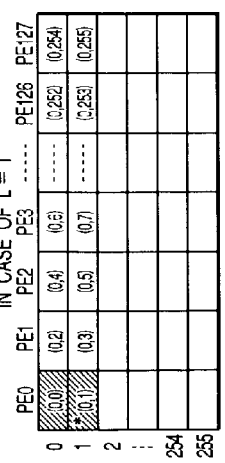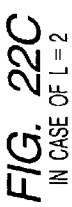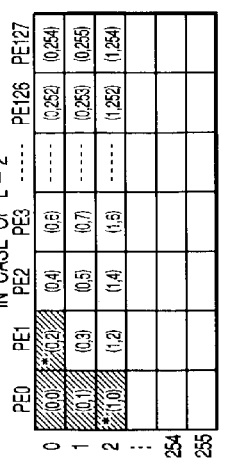

FIG. 23

| | PE0 | PE1 | PE2 | PE2 | PE3 | ..... | PE126 | PE127 | PE127 |
|---|---|---|---|---|---|---|---|---|---|
| 0 | 0 | 1 | 2 | 3 | 4 | 5 | 6 | ..... | 253 | 254 | 255 |
| 1 | 2 | 3 | 4 | 5 | 6 | 7 | 8 | ..... | 255 | 256 | 257 |
| 2 | 4 | 5 | 6 | 7 | 8 | 9 | 10 | ..... | 257 | 258 | 259 |
| 3 | 6 | 7 | 8 | 9 | 10 | 11 | 12 | ..... | 259 | 260 | 261 |
| ... | ..... | ..... | ..... | ..... | ..... | ..... | ..... | (BND=0, BLK=0) | ..... | ..... | ..... |
| 126 | 252 | 253 | 254 | 255 | 256 | 257 | 258 | ..... | 505 | 507 | 509 |
| 127 | B0 254 | B2 256 | | | | | | | | | 511 |

(arrows from B0, B1, B2 to next block)

| | PE0 | PE1 | ..... | PE126 | PE127 | PE127 |
|---|---|---|---|---|---|---|
| | 256 | 257 | 258 | ..... | 509 | 510 | 511 |
| | 258 | 259 | 260 | ..... | 511 | 512 | 513 |
| | 260 | 261 | 262 | ..... | 513 | 514 | 515 |
| | 262 | 263 | 264 | ..... | 515 | 516 | 517 |
| | ..... | ..... | (BND=0, BLK=1) | ..... | ..... | ..... |
| | 508 | 509 | 510 | ..... | 761 | 762 | 763 |
| | 510 | 511 | 512 | ..... | 763 | 764 | 765 |

| | PE0 | PE0 | PE1 | ..... | PE126 | PE126 | PE127 | PE127 |
|---|---|---|---|---|---|---|---|---|
| | 6912 | 6913 | 6914 | ..... | 7165 | 7166 | 7167 |
| | 6914 | 6915 | 6916 | ..... | 7167 | 7168 | 7169 |
| | 6916 | 6917 | 6918 | ..... | 7169 | 7170 | 7171 |
| | 6918 | 6919 | 6920 | ..... | 7171 | 7172 | 7173 |
| | ..... | (BND=0, BLK=27) | ..... |
| | 7164 | 7165 | 7166 | ..... | 7416 | 7418 | 7419 |
| | 7166 | 7167 | 7168 | ..... | 7419 | 7420 | 7421 |

| | PE0 | PE1 | PE2 | PE3 | ..... | PE126 | PE127 | PE127 |
|---|---|---|---|---|---|---|---|---|
| 128 | 7168 | 7169 | 7170 | 7171 | 7172 | 7173 | 7174 | ..... | 7421 | 7422 | 7423 |
| 129 | 7170 | 7171 | 7172 | 7173 | 7174 | 7175 | 7176 | ..... | 7423 | 7424 | 7425 |
| 130 | 7172 | 7173 | 7174 | 7175 | 7176 | 7177 | 7178 | ..... | 7425 | 7426 | 7427 |
| 131 | 7174 | 7175 | 7176 | 7177 | 7178 | 7179 | 7180 | ..... | 7427 | 7428 | 7429 |
| ... | ..... | ..... | (BND=1, BLK=0) | ..... |
| 254 | 7420 | 7421 | 7422 | 7423 | 7424 | 7425 | 7426 | ..... | 7673 | 7674 | 7675 |
| 255 | 7422 | 7423 | 7424 | 7425 | 7426 | 7427 | 7428 | ..... | 7675 | 7676 | 7677 |

| | PE0 | PE0 | PE1 | ..... | PE126 | PE127 | PE127 |
|---|---|---|---|---|---|---|---|
| | 7424 | 7425 | 7426 | ..... | 7677 | 7678 | 7679 |
| | 7426 | 7427 | 7428 | ..... | 7679 | 7680 | 7681 |
| | 7428 | 7429 | 7430 | ..... | 7681 | 7682 | 7683 |
| | 7430 | 7431 | 7432 | ..... | 7683 | 7684 | 7685 |
| | ..... | (BND=1, BLK=1) | ..... |
| | 7676 | 7677 | 7678 | ..... | 7929 | 7930 | 7931 |
| | 7678 | 7679 | 7680 | ..... | 7931 | 7932 | 7933 |

| | PE0 | PE0 | PE1 | ..... | PE126 | PE126 | PE127 | PE127 |
|---|---|---|---|---|---|---|---|---|
| | 14080 | 14081 | 14082 | ..... | 14333 | 14334 | 14335 |
| | 14082 | 14083 | 14084 | ..... | 14335 | 14336 | 14337 |
| | 14084 | 14085 | 14086 | ..... | 14337 | 14338 | 14339 |
| | 14086 | 14087 | 14088 | ..... | 14339 | 14340 | 14341 |
| | ..... | (BND=1, BLK=27) | ..... |
| | 14332 | 14333 | 14334 | ..... | 14585 | 14586 | 14587 |
| | 14334 | 14335 | 14336 | ..... | 14587 | 14588 | 14589 |

| | PE0 | PE1 | PE2 | PE2 | PE3 | ..... | PE126 | PE127 | PE127 |
|---|---|---|---|---|---|---|---|---|---|
| 4864 | 272384 | 272385 | 272386 | 272387 | 272388 | 272389 | 272390 | ..... | 272637 | 272638 | 272639 |
| 4865 | 272386 | 272387 | 272388 | 272389 | 272390 | 272391 | 272392 | ..... | 272639 | 272640 | 272641 |
| 4866 | 272388 | 272389 | 272390 | 272391 | 272392 | 272393 | 272394 | ..... | 272641 | 272642 | 272643 |
| 4867 | 272390 | 272391 | 272392 | 272393 | 272394 | 272395 | 272396 | ..... | 272643 | 272644 | 272645 |
| ... | ..... | ..... | (BND=33, BLK=0) | ..... |
| 4990 | 272636 | 272637 | 272638 | 272639 | 272640 | 272641 | 272642 | ..... | 272889 | 272890 | 272891 |
| 4991 | 272638 | 272639 | 272640 | 272641 | 272642 | 272643 | 272644 | ..... | 272891 | 272892 | 272893 |

| | PE0 | PE0 | PE1 | ..... | PE126 | PE126 | PE127 | PE127 |
|---|---|---|---|---|---|---|---|---|
| | 279296 | 279297 | 279298 | ..... | 279549 | 279550 | 279551 |
| | 279298 | 279299 | 279300 | ..... | 279551 | 279552 | 279553 |
| | 279300 | 279301 | 279302 | ..... | 279553 | 279554 | 279555 |
| | 279302 | 279303 | 279304 | ..... | 279555 | 279556 | 279557 |
| | ..... | (BND=38, BLK=27) | ..... |
| | 279548 | 279549 | 279550 | ..... | 279801 | 279802 | 279803 |
| | 279550 | 279551 | 279552 | ..... | 279803 | 279804 | 279805 |

* TARGET PIXEL POSITION

* TARGET PIXEL POSITION

FIG. 28

WORKING MEMORY LINE ADDRESS

| | | | | | | |
|---|---|---|---|---|---|---|
| 0 | (0,0) | (0,3) | (0,6) | --- | (0,378) | (0,381) |
| 1 | (0,1) | (0,4) | (0,7) | --- | (0,379) | (0,382) |
| 2 | (0,2) | (0,5) | (0,8) | --- | (0,380) | (0,383) |
| ⋮ | ⋮ | ⋮ | ⋮ | --- | ⋮ | ⋮ |
| 55 | (0,6913) | (0,6916) | (0,6919) | --- | (0,7291) | (0,7294) |
| 56 | (0,6914) | (0,6917) | (0,6920) | --- | (0,7292) | (0,7295) |
| 57 | (1,0) | (1,3) | (1,6) | --- | (1,378) | (1,381) |
| 58 | (1,1) | (1,4) | (1,7) | --- | (1,379) | (1,382) |
| 59 | (1,2) | (1,5) | (1,8) | --- | (1,380) | (1,383) |
| ⋮ | ⋮ | ⋮ | ⋮ | --- | ⋮ | ⋮ |
| 111 | (1,6913) | (1,6916) | (1,6919) | --- | (1,7291) | (1,7294) |
| 112 | (1,6914) | (1,6917) | (1,6920) | --- | (1,7292) | (1,7295) |

0-LINE DATA (rows 0–56)
1-LINE DATA (rows 57–112)

| | | | | | | |
|---|---|---|---|---|---|---|
| 284487 | (4991,0) | (4991,3) | (4991,6) | --- | (4991,378) | (4991,381) |
| 284488 | (4991,1) | (4991,4) | (4991,7) | --- | (4991,379) | (4991,382) |
| 284489 | (4991,2) | (4991,5) | (4991,8) | --- | (4991,380) | (4991,383) |
| ⋮ | ⋮ | ⋮ | ⋮ | --- | ⋮ | ⋮ |
| 284542 | (4991,6913) | (4991,6916) | (4991,6919) | --- | (4991,7291) | (4991,7294) |
| 284543 | (4991,6914) | (4991,6917) | (4991,6920) | --- | (4991,7292) | (4991,7295) |

4991-LINE DATA

FIG. 29

IMAGE PROCESSING APPARATUS, IMAGE PROCESSING METHOD, CONTROL PROGRAM AND RECORDING MEDIUM

BACKGROUND OF THE INVENTION

1. Field of the Invention

The present invention relates to an image processing apparatus which processes image data, represented by a digital signal, on the basis of a SIMD (Single Instruction stream Multiple Data stream) processor, an image processing method for the image processing apparatus, a control program to achieve the image processing method, and a recording medium on which the control program is stored.

2. Related Background Art

At present, as an image processing apparatus, a so-called MFP (MultiFunciton Printer) which is a multifunction machine composed of a copying machine, a facsimile machine, a printer, a scanner and the like is provided. In connection with this, a technique to achieve a high-speed and programmable image process by using a SIMD processor as an image processing unit in the MFP is disclosed in, for example, U.S. Pat. No. 6,067,088.

Conventionally, in the MFP, when multivalued original image data read by a scanner is output to a binary printer, an error diffusion process to represent pseudo-halftone of the original image data might be performed. Here, the error diffusion process is a sequential process by which, on the basis of a binarization error occurred in case of binarizing a target pixel, multivalued data of a target pixel to be later binarized is corrected.

A technique to perform the error diffusion process by using a SIMD processing unit and the sequential process by using an auxiliary processing unit is disclosed in Japanese Patent Application Laid-Open No. 2001-274993.

However, in such a conventional example, since the auxiliary processing unit is necessary in addition to the SIMD processing unit to perform the sequential process such as the error diffusion process, a circuit size increases as a whole, and this causes an increase in cost. Moreover, it is also necessary to provide an interface circuit block between the SIMD processing unit and the auxiliary processing unit, a control block to control the internet circuit block, and the like, whereby the apparatus has the inefficient structure as a whole.

SUMMARY OF THE INVENTION

The present invention is made in consideration of such a problem as above, and an object thereof is to provide an image processing apparatus which can perform an image process such as an error diffusion process or the like by using a SIMD processing unit without using any auxiliary processing unit for a sequential process, an image processing method for the image processing apparatus, a control program to achieve the image processing method, and a recording medium on which the control program is stored.

Another object of the present invention is to provide an image processing apparatus which can perform a sequential process as effectively operating plural processing units included in a SIMD processor even if the number of pixels of input image data of one line obtained by raster scan is equal to or larger than the number of the processing units included in the SIMD processor, an image processing method for the image processing apparatus, a control program to achieve the image processing method, and a recording medium on which the control program is stored.

In order to solve the above problem and achieve the above objects, the present invention is characterized by an image processing apparatus which processes input image data of Y lines, each line consisting of X pixels, by using an SIMD (Single Instruction stream Multiple Data stream) processor, comprising: a calculation means including N (X>N>1, Y>N>1) elemental processors capable of operating in parallel; an input means for dividing the image data of one line with respect to every N pixels and inputting the divided image data; a storage means for storing the divided and input N-pixel image data of the N lines; and an image processing means for supplying, from among the N-pixel image data of the N lines stored in the storage means, the N image data respectively to the N elemental processors of the calculation means, and causing the respective elemental processors to perform the calculations of the same kind in parallel.

Moreover, in the image processing apparatus according to the present invention, the N image data respectively supplied to the N elemental processors and processed in parallel are respectively the input image data of the different lines.

Moreover, in the image processing apparatus according to the present invention, the image processing means for causing the N elemental processors to perform the calculations in parallel performs an error diffusion process.

Moreover, in the image processing apparatus according to the present invention, the calculation means including the N elemental processors further includes a means for calculating a quantization error generated in the error diffusion process as an error value with respect to every N elemental processors, and each of the elemental processors processes the image data input to the elemental processor based on the error value calculated for the adjacent elemental processor.

Moreover, in the image processing apparatus according to the present invention, the calculation means including the N elemental processors further includes a means for calculating a quantization error generated in the error diffusion process as an error value with respect to every N elemental processors, and each of the elemental processors processes the image data input to the elemental processor based on the error value calculated for the elemental processor at least immediately before.

Moreover, in the image processing apparatus according to the present invention, in a case where the number of blocks obtained by dividing the X pixels constituting one line with respect to every N pixels is assumed to be BLK, the calculation means including the N elemental processors includes at least BLK×N error storage means.

Moreover, in the image processing apparatus according to the present invention, in a case where the number of bands obtained by dividing the input image data of the Y lines with respect to every N lines is assumed to be BND, the error data stored in the at least BLK×N error storage means are used to process the image data belonging to different BND.

Moreover, the present invention is characterized by an image processing apparatus which processes input image data of Y lines, each line consisting of X pixels, by using an SIMD processor, comprising: a calculation means including N (X>N>1, Y>N>1) elemental processors capable of operating in parallel; an input means for dividing the image data of one line with respect to every N pixels and inputting the divided image data; a storage means for storing the divided and input N-pixel image data of the N×M (M is natural number) lines; and an image processing means for supplying, from among the N-pixel image data of the M lines stored in the storage means, the N image data respectively to the N elemental processors of the calculation means, and causing the respective elemental processors to perform the calculations of the same kind in parallel.

Moreover, in the image processing apparatus according to the present invention, the N image data respectively supplied to the N elemental processors and processed in parallel are respectively the input image data of the different lines.

Moreover, in the image processing apparatus according to the present invention, each of the N elemental processors processes the image data of the plural continuous pixels in one line.

Moreover, in the image processing apparatus according to the present invention, the input means divides the image data of one line into the N-pixel image data at odd-numbered pixel positions in one line and the N-pixel image data at even-numbered pixel positions, and inputs the divided image data.

Moreover, in the image processing apparatus according to the present invention, the image processing means for causing the N elemental processors to perform the calculations in parallel performs an error diffusion process.

Moreover, in the image processing apparatus according to the present invention, the calculation means including the N elemental processors further includes a means for calculating a quantization error generated in the error diffusion process as an error value with respect to every N elemental processors, and each of the elemental processors processes the image data input to the elemental processor based on the error value calculated for the adjacent elemental processor.

Moreover, in the image processing apparatus according to the present invention, the calculation means including the N elemental processors further includes a means for calculating a quantization error generated in the error diffusion process as an error value with respect to every N elemental processors, and each of the elemental processors processes the image data input to the elemental processor based on the error value calculated for the elemental processor at least immediately before.

Moreover, in the image processing apparatus according to the present invention, in a case where the number of blocks obtained by dividing the X pixels constituting one line with respect to every N×M pixels is assumed to be BLK, the calculation means including the N elemental processors includes at least BLK×N×M error storage means.

Moreover, in the image processing apparatus according to the present invention, in a case where the number of bands obtained by dividing the input image data of the Y lines with respect to every N lines is assumed to be BND, the error data stored in the at least BLK×N×M error storage means are used to process the image data belonging to different BND.

Moreover, in the image processing apparatus according to the present invention, each of the N elemental processors processes the image data of the M pixels continuous in a line direction of the one-line input image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram showing A4 original image data output from a reading unit 201 shown in FIG. 2;

FIG. 7 is a diagram showing relation between image data stored in a working memory 216 and addresses of the working memory 216;

FIGS. 9A, 9B, 9C, 9D, 9E, 9F, 9G, 9H and 9I are diagrams for explaining a binarization process according to the embodiment;

FIG. 14 is a diagram showing relation between the image data stored in the working memory 216 and the addresses of the working memory 216;

FIG. 19 is a diagram showing relation between original image data and addresses of a working memory, according to the second embodiment;

FIG. 21 is a diagram showing the value of a sep-type variable K with respect to each PE, according to the second embodiment;

FIGS. 22A, 22B, 22C, 22D, 22E, 22F, 22G, 22H and 22I are diagrams showing the contents of an internal memory according to the value of L;

FIG. 23 is a diagram showing the arrangement of original image data to which a binarization process is performed and order of the binarization processes, corresponding to an increase of L;

FIG. 28 is a diagram showing relation between original image data stored in a working memory 216 and addresses of the working memory, according to the third embodiment; and FIG. 29 is a diagram for explaining a binarization process according to the third embodiment.

DETAILED DESCRIPTION OF THE PREFERRED EMBODIMENTS

Preferred embodiments of the present invention sill now be described in detail in accordance with the accompanying drawings.

(General Explanation of Image Processing Apparatus)

Figure 1:
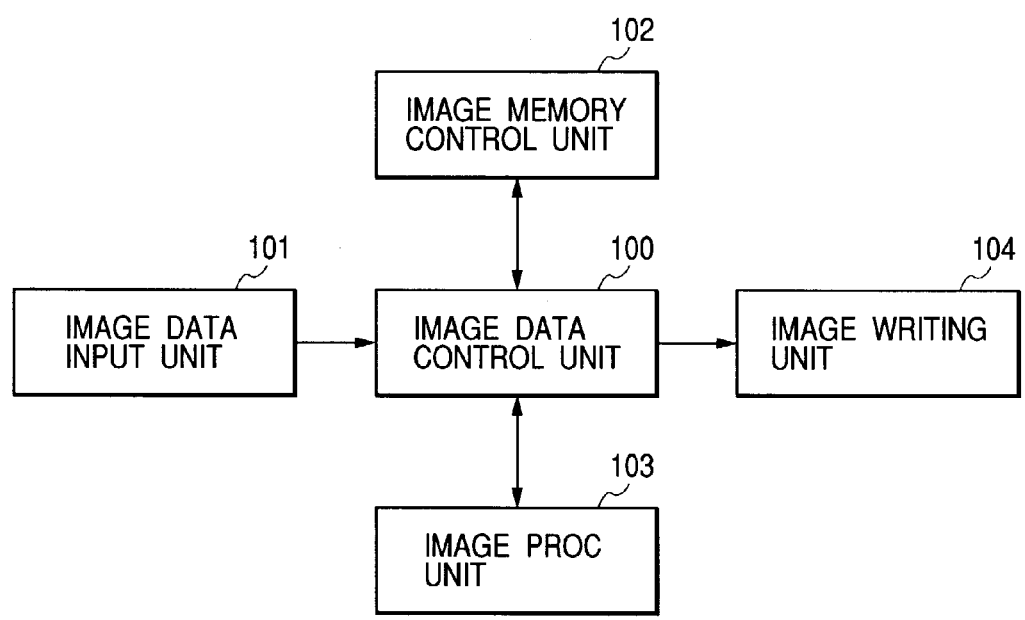
FIG. 1 is a block diagram functionally showing the structure of an image processing apparatus according to the embodiment of the present invention.

First of all, a principle of an image processing apparatus according to the embodiment will be explained. FIG. 1 is a block diagram functionally showing the structure of the image processing apparatus according to the embodiment of the present invention. As shown in FIG. 1, the image processing apparatus includes following five units.

The five units are an image data control unit 100, an image data input unit 101 which inputs image data, an image memory control unit 102 which controls an image memory to write/read the image data to/from the image memory, an image processing unit 103 which performs image processes such as processing, editing and the like to the image data, and an image writing unit 104 which writes an image represented by the image data on a recording paper or the like.

It should be noted that the image data control unit 100 is set as the center of these units.

That is, the image data input unit 101, the image memory control unit 102, the image processing unit 103, and the image writing unit 104 are all connected to the image data control unit 100. Hereinafter, each of these units will be explained in detail.

The image data control unit 100 performs a control data but interface process, entire system control, a local bus control process (an access control process for ROM and RAM to activate a system controller), an interface process with the image data input unit 101, an interface process with the image memory control unit 102, an interface process with the image processing unit 103, an interface process with the image writing unit 104, a network control process, and the like.

The image data input unit 101 performs an interface control process with the system controller, a reading process of original reflection light by an optical system, a conversion process to an electrical signal using a CCD (charge coupled device) or the like, a digitizing process using an A/D converter, a shading correction process (a process to correct unevenness of illumination distribution of a light source), a process to correct a density characteristic of a reading system, a rasterizing process of PDL (page description language) image data input through a network, and the like.

The image memory control unit 102 performs an interface control process with the system controller, a writing/reading process to a memory unit, an access control process to a memory module (an adjustment process to memory access requests from plural units), and the like.

The image processing unit 103 performs a color conversion process, a color correction process, an MTF (modulation transfer function) correction process, a smoothing process, an arbitrary magnification changing process in a main scan direction, a density conversion (a gamma conversion process; corresponding to a density adjustment key), a simple binarization process, various pseudo-halftone processes, a dot arrangement phase control process (jaggy correction), an image area separation process (color discrimination, attribute discrimination, an adaptive process), a density conversion process, and the like.

The image writing unit 104 performs a pulse control process of an image signal, a format conversion process of parallel and serial data, and the like.

(Hardware Structure of Digital Multifunction Machine)

Figure 2:
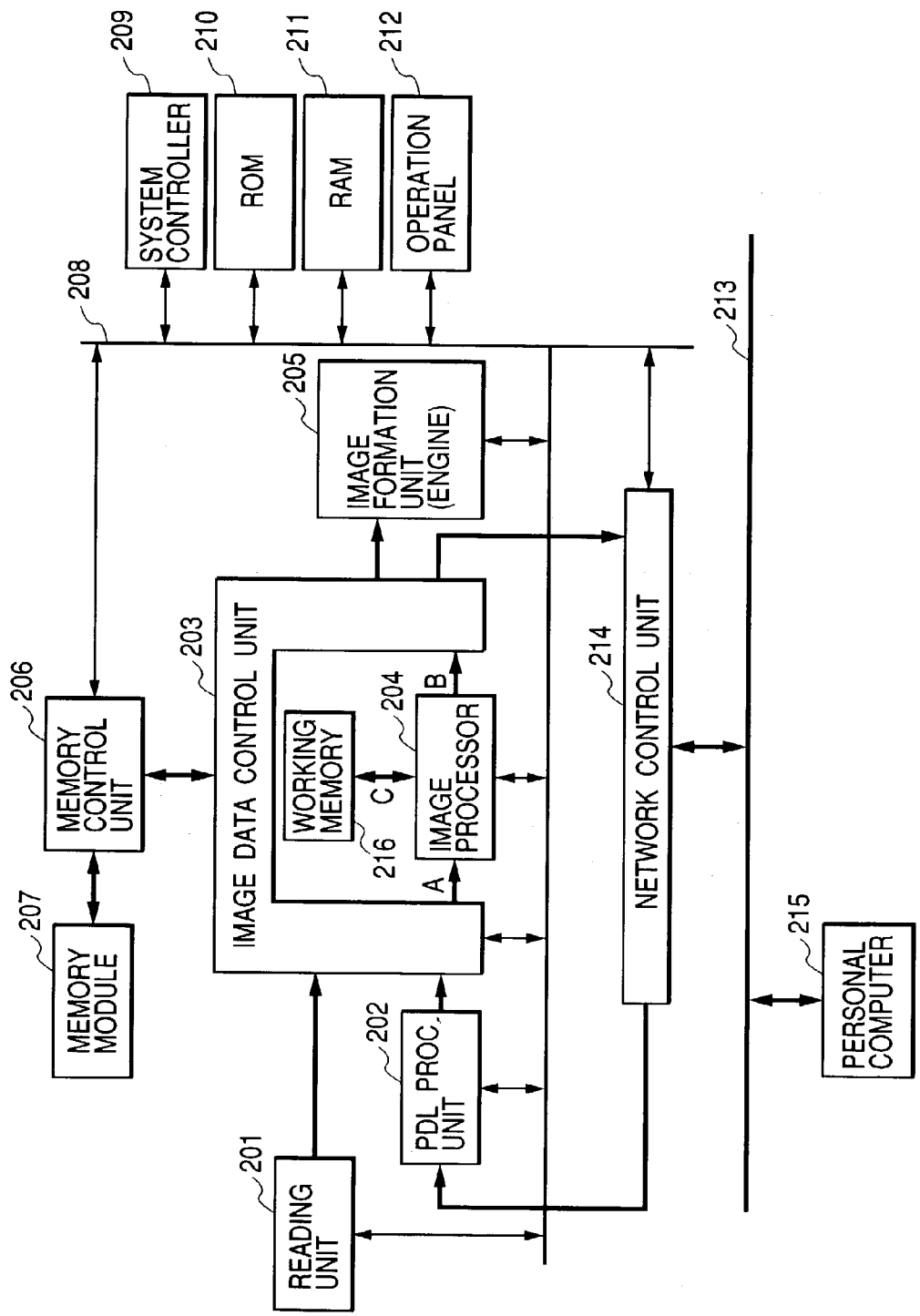
FIG. 2 is a block diagram showing the hardware structure of the image processing apparatus according to the embodiment.

Next, the hardware structure in a case where the image processing apparatus according to the embodiment constitutes a digital multifunction machine will be explained. FIG. 2 is a block diagram showing an example of the hardware structure of the image processing apparatus according to the embodiment.

In FIG. 2, the image processing apparatus according to the embodiment includes a reading unit 201, a PDL processing unit 202, an image data control unit 203, an image processor 204, an image formation unit 205, a memory control unit 206, a memory module 207, a network control unit 214, and a working memory 216. Moreover, the image processing apparatus according to the embodiment includes a system controller 209, a ROM 210, a RAM 211 and an operation panel 212 through a control data bus 208, and is further connected to a personal computer 215 through a network 213.

In the above structure, the image processor 204 is a programmable image processing means which processes image data represented by a digital signal generated based on an image to be able to output the image data as the image, and can achieve plural image formation operations. Moreover, the image data control unit 203 is an image data transfer administration means which administrates the image data transfer between the data bus for transferring the image data and the processing units used in the image process by the image processor 204 at all one time. That is, the image data control unit 203 performs data transfer administration among the reading unit 201, the PDL processing unit 202, the image processor 204, the memory control unit 206, the image formation unit 205, and the network control unit 214. Here, it should be noted that the present invention mainly concerns the image processor 204, and the structure of the image processor 204 will be explained in detail in and after FIG. 3.

Moreover, the image processing apparatus according to the embodiment includes, as an image data storage administration means, the memory module 207 connected to the image memory control unit 206.

Here, the relation of the above structural units and the units 100 to 104 shown in FIG. 1 will be explained. That is, the function of the image data input unit 101 shown in FIG. 1 is achieved by the reading unit 201 and the PDL processing unit 202. Likewise, the function of the image data control unit 100 is achieved by the image data control unit 203, the system controller 209, the ROM 210, the RAM 211, the operation panel 212 and the network control unit 214. Likewise, the function of the image processing unit 103 is achieved by the image processor 204 and the working memory 216.

Likewise, the image writing unit 104 is achieved by the image formation unit 205, and the image memory control unit 102 is achieved by the memory control unit 206 and the memory module 207.

Here, the system controller 209 operates based on a control program stored in the ROM 201 connected through the control data bus 208, and uses the RAM 211 as a working memory. Moreover, the operations of the reading unit 201, the PDL processing unit 202, the image data control unit 203, the image processor 204, the image formation unit 205, the memory control unit 206, the network control unit 214 and the operation panel 212 are controlled by the system controller 209 through the control data bus 208.

Then, the contents of the respective structural units will be explained. The reading unit 201 which optically reads an original consists of a lamp, a mirror, a lens and a photo acceptance unit. The reading unit 201 condenses the reflection light of the lamp illumination reflected on the original to the photo acceptance unit through the mirror and the lens.

The image data which has been converted into an electrical signal by the photo acceptance unit such as a CCD or the like is further converted into a digital signal, and the obtained digital signal is output (transmitted) by the reading unit 201.

The PDL processing unit 202 is the unit which rasterizes PDL image data output from the personal computer 215 connected on the network 213 to generate a bitmap image. If the PDL image data input through the network 213 is input to the PDL processing unit 202 through the network control unit 214, the PDL processing unit 202 performs the rasterizing based on the input PDL image data, and then outputs (transmits) obtained bitmap image data. Thus, the image data output (transmitted) from the reading unit 201 and the PDL processing unit 202 are input (received) by the image data control unit 203.

The image data received by the image data control unit 203 from the reading unit 201 and the PDL processing unit 202 are then output to the image processor 204 or the memory control unit 206.

First, the operation in a case where the image data is output to the image processor 204 will be explained.

In the image processor 204, the input image data is processed by using the working memory 216, and again output to the image data control unit 203. The image data input to the image data processing unit 203 from the image processor 204 is output to the memory control unit 206, and is then stored in the memory module 207.

After the process of the image data of one screen (image plane) by the image processor 204 ends and the processed data of one screen is stored in the memory module, the memory control unit 206 reads the image data from the memory module 207, outputs the read image data to the image formation unit 205 through the image data control unit 203, and thus obtains a print output. Alternatively, the memory control unit 206 outputs the image data read from the memory module 207 to the network control unit 214 through the image data control unit 203, and then outputs the data to the personal computer 215 through the network 213.

Next, the operation in a case where the image data received by the image data control unit 203 from the reading unit 201 and the PDL processing unit 202 is output to the memory control unit 206 will be explained. The image data input from the image data control unit 203 to the memory control unit 206 is stored in the memory module 207. Then, the memory control unit 206 reads the stored image data from the memory module 207 and outputs the read image data to the image processor 204 through the image data control unit 203. The image processor 204 processes the input image data, and again stores the processed data in the memory module 207 through the image data control unit 203 and the memory control unit 206. After the process of the image data of one screen (image plane) by the image processor 204 ends and the processed data of one screen is stored in the memory module 207, the memory control unit 206 reads the image data from the memory module 207, outputs the read image data to the image formation unit 205 through the image data control unit 203, and thus obtains a print output. Alternatively, the memory control unit 206 outputs the image data read from the memory module 207 to the network control unit 214 through the image data control unit 203, and then outputs the data to the personal computer 215 through the network 213.

In the above operation example, after the process to the image data output from the reading unit 201 and the PDL processing unit 202 is performed by the image processor 204 and the processed image data of one screen is stored in the memory module 207, the processed image data is read from the memory module 207 and then output to the image formation unit 205 or the network control unit 214. However, it is possible to control the memory control unit 206 to start reading the processed image data from the memory module 207 before the storage of the processed image data of one screen ends.

Moreover, an operation example that the image data is not stored in the memory module 207 will be explained.

The image data received by the image data control unit 203 from the reading unit 201 and the PDL processing unit 202 is output to the image processor 204. Then, the image processor 204 performs a predetermined process to the input image data, and outputs the processed image data again to the image data control unit 203. The image data input from the image processor 204 to the image data control unit 203 is then output to the image formation unit 205 and the network control unit 214 through the image data control unit 203.

As an operation example in case of storing the processed image data of one screen in the memory module 207, when plural copies are produced from one original, there is a method of operating the reading unit 201 once, storing the image data read by the reading unit 201 in the memory module 207, and then reading the stored image data plural times.

As the operation example that the image data is not stored in the memory module 207, there is a case where one original is copied only once. In this case, the processed data obtained from the read image data only has to be directly output to the image formation unit 205, whereby it is unnecessary to access the memory module 207 any more.

Incidentally, the entire operation of the apparatus is controlled by the system controller 209 on the basis of the process input from the operation panel 212 to be performed by the image processing apparatus. More specifically, kinds of processes (i.e., copying, transmission, image reading, printing, etc.), the number of processes, and the like can be input from the operation panel 212.

Figure 3:
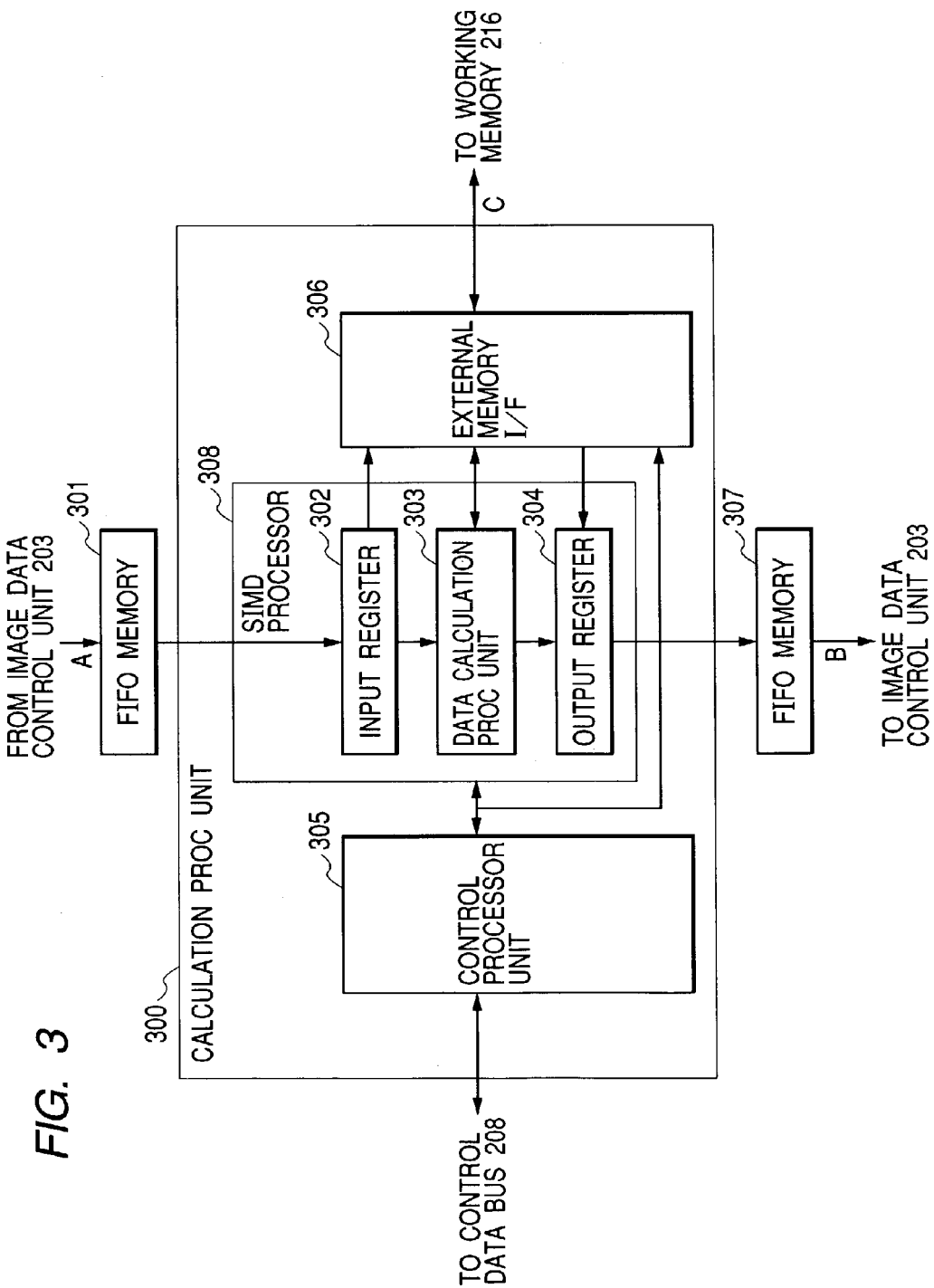
FIG. 3 is a block diagram for explaining the structure of an image processor 204 shown in FIG. 2.

FIG. 3 is a block diagram for explaining the structure of the image processor 204 shown in FIG. 2. The image processor 204 consists of FIFO memories 301 and 307 and a calculation processing unit 300. The calculation processing unit 300 includes an SIMD processor 308 composed of an input register 302, an output register 304 and an SIMD data calculation processing unit (simply called data calculation processing unit hereinafter) 303, a control processor unit 305, and an external memory I/F (interface) 306. Here, the SIMD processor is to execute a single instruction for plural data in parallel, and the data calculation processing unit 303 in the embodiment consists of 128 PE registers. The FIFO memory 301 is the first-in, first-out memory which has a capacity of image data of one line (corresponding to 7168 pixels) input from the reading unit 201 or the PDL processing unit 202, and the data writing to the FIFO memory 301 is controlled independently of the data reading from the FIFO memory 301. The image data from a data bus A of the image data control unit 203 is input to the FIFO memory 301, and the input image data is divided into 56 and further input as the 128 image data to the input register 302 having the registers the number of which is the same as the number of the PE registers of the data calculation processing unit 303. The image data input from the FIFO memory 301 to the input register 302 is then output to the data calculation processing unit 303 and the external memory I/F 306. The data calculation processing unit 303 performs a predetermined process to the input image data, and then outputs the processed data to the output register 304 and the external memory I/F 306. Here, it should be noted that the external memory I/F 306 can also output the intermediate data processed by the data calculation processing unit 303. Moreover, like the input register 302, the output register 304 has the registers the number of which is the same as the number of the PE registers of the data calculation processing unit 303. The output image data from the output register 304 is input to the FIFO memory 307 having a capacity of image data of one line, and the FIFO memory 307 is the first-in, first-out memory of which the data writing and the data reading are controlled independently. The image data signal output from the FIFO memory 307 is further output to the image data control unit 203 through a data bus B. Moreover, the SIMD processor 308 and the external memory I/F 306 are connected to the control processor unit 305 connected to the control data bus 208 shown in FIG. 2. The control processor unit 305 supplies an instruction to the PE registers of the data calculation processing unit 303, judges the status of each PE register, controls data input/output to/from the memory and register connected to each PE register, controls the external memory I/F 306, and performs data control among the internal memory and register of the SIMD processor 308 and the working memory 216. Here, it should be noted that the control processor unit 305 and the SIMD processor 308 can perform mutually different processes independently.

Figure 4:
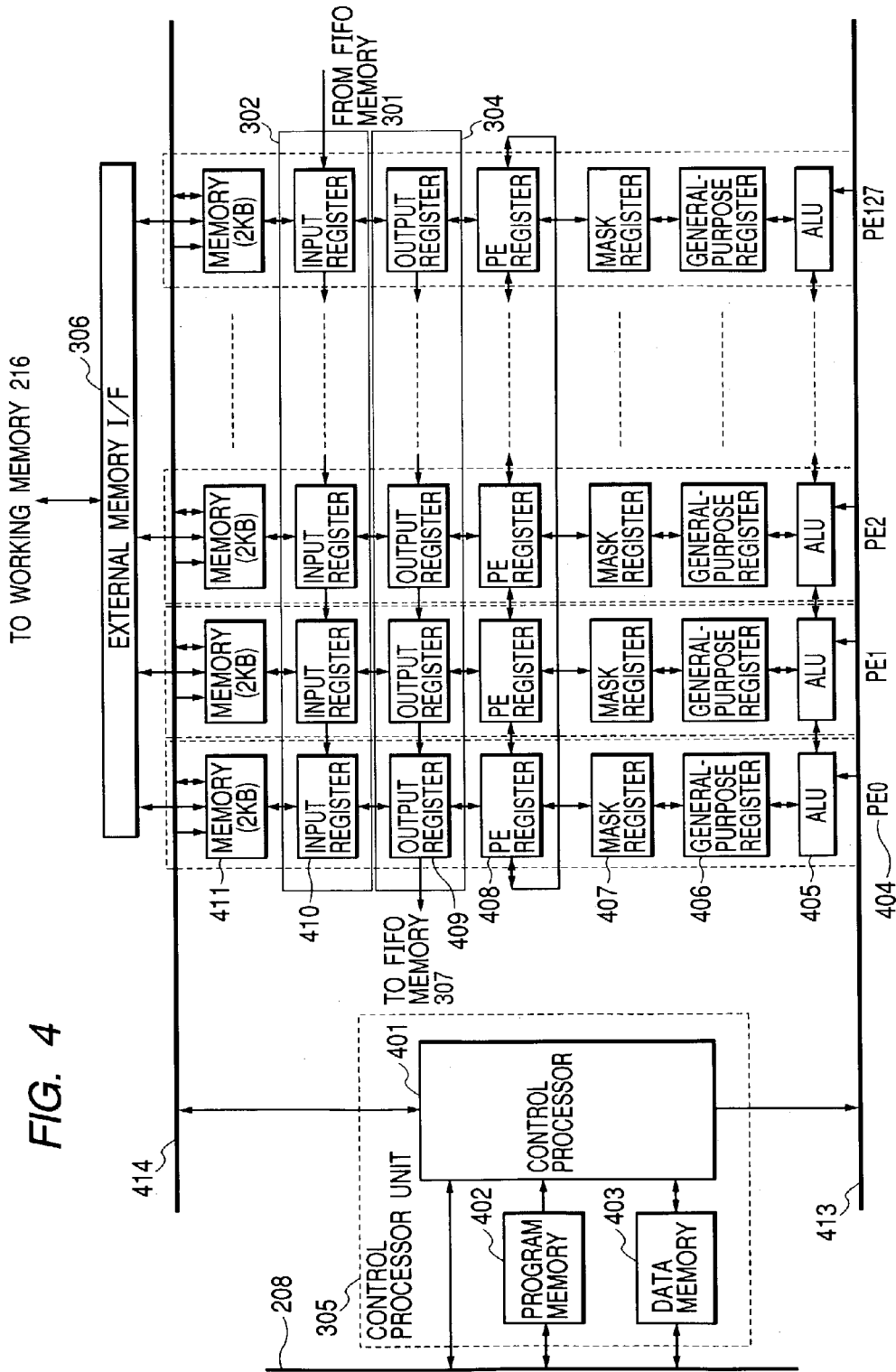
FIG. 4 is a block diagram showing the structure of a calculation processing unit 300 constituting a SIMD processor.

FIG. 4 is a schematic block diagram showing the structure of the calculation processing unit 300 including the data calculation processing unit 303 constituting the SIMD processor. Hereinafter, the calculation processing unit 300 will be explained.

In FIG. 4, the control processor unit 305 also shown in FIG. 3 includes a control processor 401, a program memory 402 storing programs to control the control processor and the SIMD processor, and a data memory 403. Numeral 404 denotes a PE which constitutes together with other PE's the SIMD processor 308, that is, as described above, the SIMD processor 308 in the embodiment consists of the 128 PE's (PE0 to PE127).

As shown in FIG. 4, each PE includes an eight-bit ALU (arithmetic logical unit) 405, a general-purpose register 406 composed of 16 eight-bit registers, a mask register 407 for controlling whether or not to perform an arithmetic operation of the ALU, a PE register 408 for storing the data under the arithmetic operation, an output register 409, an input register 410, and a memory 411 having a capacity of 2 KB. Here, the ALU 405 and the PE register 408 are connected respectively to the ALU and the PE register in the adjacent PE1, whereby the data can be exchanged between the PE0 and the PE1. Also, the output and input registers 409 and 410 are connected respectively to the output and input registers in the adjacent PE1, whereby the respective registers operate together as a 128-step shift register. Incidentally, in FIG. 4, the blocks corresponding to the input register 302 and the output register 304 in FIG. 3 are shown by the same numerals as those in FIG. 3.

Moreover, the memory 411 in each PE is connected to the working memory 216 by a data bus C through the external memory I/F 306.

Incidentally, the ALU 405, the general-purpose register 406, the mask register 407, the PE register 408, the output register 409, the input register 410 and the memory 411 which together constitute the single PE are structured so that the data can be exchanged between the arbitrary blocks. For example, the data can be transferred from the memory 411 to the PE register 408, and the data can be further transferred from the PE register 408 to the external memory I/F 306.

The instruction of the same contents is supplied to each PE from the control processor 401 through an instruction supply bus 413, so that all the PE's operate according to the same instruction. However, if the process-target data to be supplied to each PE is made different from others, it is possible to control the respective PE's to perform the calculations (processes) of the different process-target data in parallel. For example, if the contents of the 128 pixels in one-line image data are arranged to the PE registers with respect to each pixel and it causes the PE registers to perform the calculations based on the same instruction code, the processed result of the 128 pixels can be obtained in a time shorter than that in case of performing the sequential process for the pixels one by one.

Since the calculated result of the ALU 405 and the content of the PE register 408 in each PE can be output/input to/from the adjacent PE, it is possible by each PE to perform the calculation process in reference to the PE register 408 and the calculated result of the ALU 405 in the adjacent PE. Moreover, the memory 411, the input register 410, the output register 409, the PE register 408, the mask register 407 and the general-purpose register 406 in each PE are connected to the control processor 401 through a memory/register access bus 414, whereby the input and output of the data of each register are controlled by the control processor 401.

Moreover, the control data can be exchanged between the control processor 401 and the system controller 209 of FIG. 2 through the control data bus 208, and the program memory 402 for controlling the operation of the control processor 401 and the data memory 403 can be accessed by the system controller 209 through the control data bus 208. Thus, the program memory 402 for controlling the operation of the control processor 401 can be rewritten by the system controller 209 in accordance with the content of the process to be performed by the calculation processing unit 300.

First Embodiment

Hereinafter, the first embodiment that the present invention is applied to an error diffusion process will be explained in detail.

FIG. 5 is a diagram showing A4 original image data arrangement output from the reading unit 201 shown in FIG. 2. In FIG. 5, the main scan direction indicates the direction along which the pixels of the CCD provided on the reading unit 201 are arranged, and this direction is called a line direction. Thus, the reading area of the main scan (line) direction is sequentially scanned in the sub scan direction, whereby a reading operation of the two-dimensional original image data is performed. In the present embodiment, the reading resolution of the reading unit 201 is set to 600 dpi, and the A4 original image is represented by two-dimensional data of 7168 pixels in the main scan direction and 4992 pixels in the sub scan direction. FIG. 5 shows the example of the original image data output from the reading unit 201. On one hand, when the image data output from the PDL processing unit 202 corresponds to the A4-sized print data, it has the same data arrangement as that shown in FIG. 5. That is, although the example that the image data output from the reading unit 201 is processed will be explained hereinafter, such an explanation is similarly applicable to the case where the image data output from the PDL processing unit 202 is processed.

Figure 6:
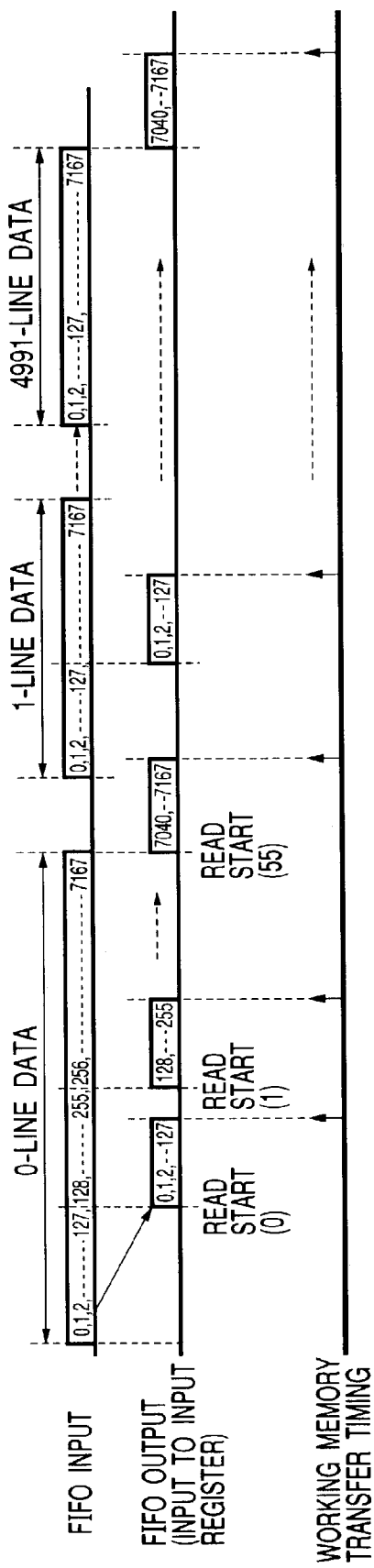
FIG. 6 is a diagram for explaining the operation of an FIFO (first-in, first-out) memory 301 shown in FIG. 3.

The A4 original image data output from the reading unit 201 is input to the image data control unit 203, and further input to the FIFO memory 301 (FIG. 3) of the image processor 204. FIG. 6 shows the outline of the operation of the FIFO memory 301.

The FIFO memory 301 is the line memory which has a capacity of one line (7168 pixels), and the input image data is written in the FIFO memory 301 in response to a clock synchronous with the original image data output from the reading unit 201. A read clock is the clock which is output from the calculation processing unit 300. In any case, after the image data of the 128 pixels are written in the FIFO memory, the read operation of the image data of the 128 pixels is started at timing of read start (0). In the present embodiment, the write and read clocks to the FIFO memory 301 are respectively set to 20 MHz and 100 MHz so that the read clock is faster than the write clock. The image data read from the FIFO memory 301 is input to the input register 302 of FIG. 3 in response to the clock synchronous with the read clock of the FIFO 301. If the image data of the 128 pixels are input to the input register 301, the input image data are stored in the working memory 216 through the external memory I/F 306 of FIG. 3. Incidentally, it should be noted that the write operation of the input image data into the FIFO memory 301 is continuously performed during the above operation. Moreover, after the image data of the 256 pixels are written in the FIFO memory, the read operation of the image data of the 128 pixels is started at timing of read start (1). Then, by the same operation as above, the image data of the $128^{th}$ to $256^{th}$ pixels are stored in the working memory 216.

By repeating the above operation 56 times, the one-line image data of the 7168 pixels are stored in the working memory 216 with respect to every 128 pixels. Similarly, the image data of the successive line are stored in the working memory 216 with respect to every 128 pixels. Here, it should be noted that the speed of the read clock to the write clock of the FIFO memory 301 is not limited to the above if, at that speed, the image data to be input to the FIFO memory can be input to the input register and transferred to the working memory 216 with respect to every 128 pixels without fail.

FIG. 7 is a diagram schematically showing the relation between the image data stored in the working memory 216 and the addresses of this working memory. The addresses of the working memory 216 are allocated from "0" with respect to each data block consisting of the continuous 128 pixels as one line, and the image data stored at the line addresses 0 to 55 of the working memory correspond to the headmost one line of the input image data (i.e., 0-line data). Here, it is assumed that the data transfer from the input register 302 to the working memory 216 and the address control of the working memory are performed under the control of the control processor unit 305 shown in FIG. 3.

Figure 8B:
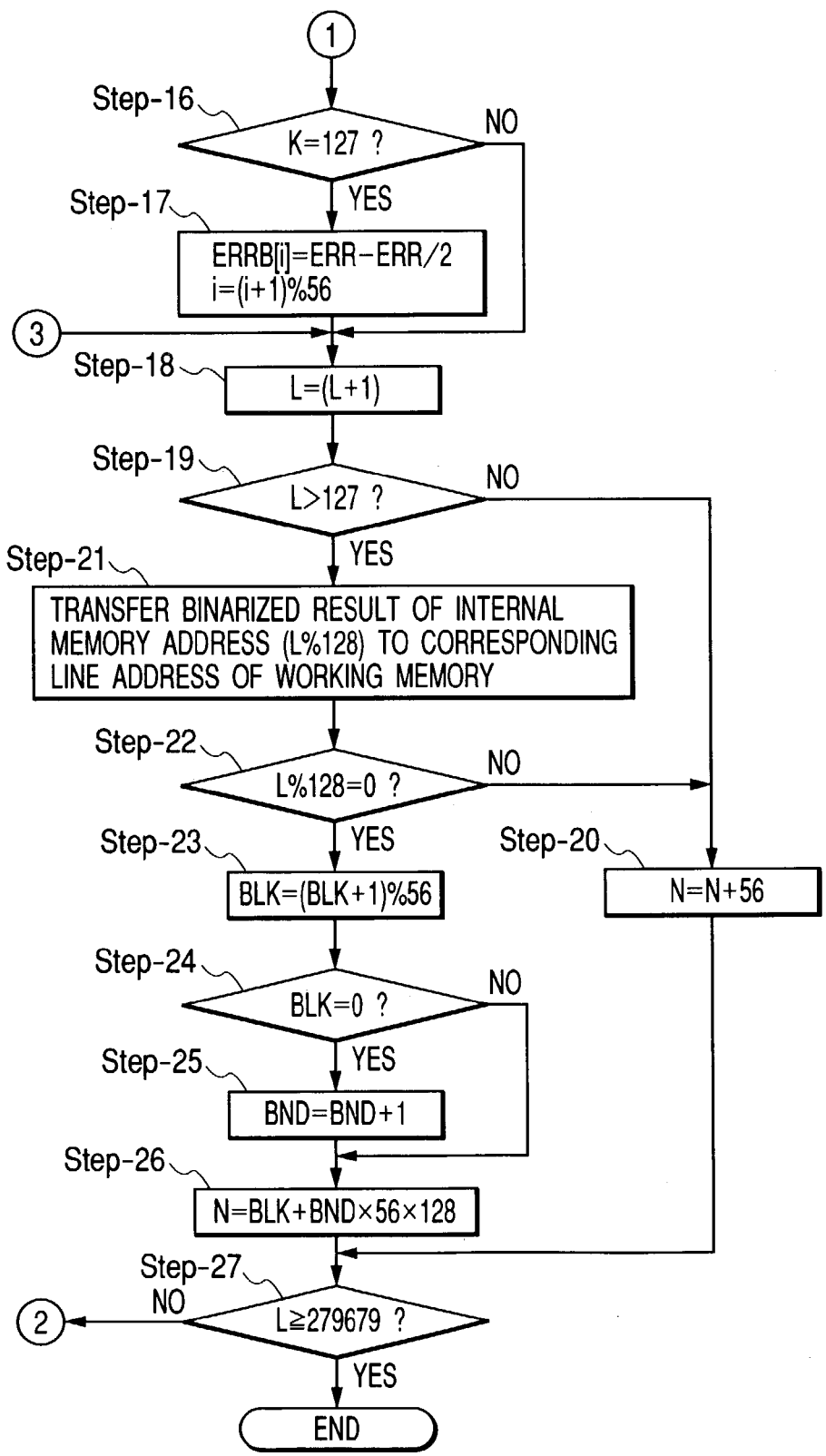
FIG. 8 which is composed of FIGS. 8A and 8B is a flow chart showing the operation of a data calculation processing unit 303 shown in FIG. 3.

Next, the operation of the data calculation processing unit 303 of FIG. 3 will be explained with reference to a flow chart shown in FIG. 8 composed of FIGS. 8A and 8B. In Step-1, it waits until the input image data of the 128 lines are captured or fetched in the working memory 216. If the capture of the input image data of the 128 lines in the working memory 216 ends, the flow advances to Step-2. Here, it should be noted that the capture of the input image data in the working memory continues until the image data of the 4992 lines corresponding to the A4 original image are captured. In Step-2, variables are initialized. Here, the variables will be explained. The variables used in the calculation processing unit 300 include the variable which the PE's of the data calculation processing unit 303 have in parallel and the variable which the PE's do not have in parallel. The variable which the PE's have in parallel is the variable which is allocated to each PE, and this is called a sep-type variable. The sep-type variable can be used as a different value for each PE, and, as one kind variable, there are provided the 128 variables declared as the sep-type variable being the same as the number of the PE's constituting the data calculation processing unit 303 in the present embodiment. When the PE's perform in parallel the calculations using the variable which the PE's do not have in parallel, the respective PE's refer to the common variable value, while when the PE's perform in parallel the calculations using the variable which the PE's have in parallel, the respective PE's can refer to the different variable values (through the variable name is the same).

In Step-2, a variable N (line address of working memory), a variable L (the number of data transfer), a variable BND (band), and a variable BLK (block) are initialized, and further a sep-type variable i (an index of connection error), sep-type variables ERRB[0] to ERRB[55] (56 connection error data) are initialized. Here, BND (band) indicates the variable obtained by setting the 128 lines in the sub scan direction of the input image data as one band, and BLK (block) indicates the variable obtained by setting the 128 pixels in the main scan direction of the input image data as one block. With respect to the A4 original image data of which the number of main-scan pixels is 7168 and the number of sub-scan lines is 4992, BND has the values of 0 to 38, and BLK and i have the values of 0 to 55. Moreover, the sep-type variables ERRB[0] to ERRB[55] indicate the memories for storing the distribution elements, in the sub scan direction, of the binarization error occurred in the binarization process, and each PE includes the 56 memories. Here, it should be noted that the number 56 is the same as the number of variables BLK arranged in the main scan direction, and the distribution of the binarization error in the sub scan direction is performed in each PE between the same BLK's successive in the sub scan direction.

Next, in Step-3, the image data of the 128 pixels of the line address N of the working memory 216 are transferred to the memory 411 included in each PE of the data calculation processing unit 303. Here, L %128 indicates the value of the remainder obtained by dividing L by 128, and register 302, and this remainder corresponds to a transfer destination address on the memory 411. The remainder obtained by dividing L by 128 is equivalent to the value of the lower seven bits of L.

Figures 9A, 9B, 9C, 9D, 9E, 9F, 9G, 9H, 9I:
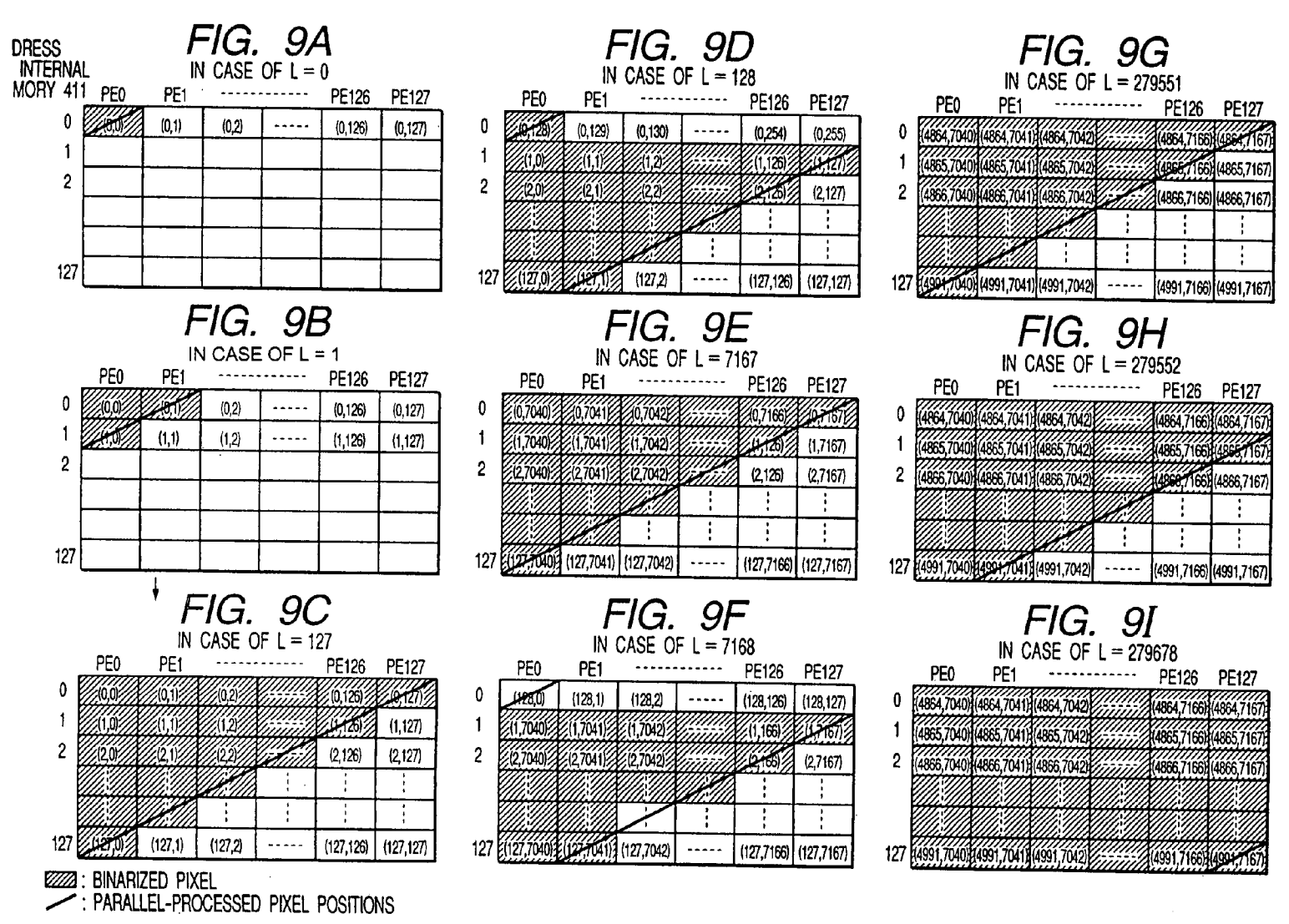

FIG. 9A shows the arrangement of the image data transferred from the working memory 216 to the memory 411 in case of L=0. In this case, the image data of the first 128 pixels in the main scan direction is stored with respect to each pixel at the address 0 of the memory 411 included in each PE.

Figures 10, 11:
FIG. 10 is a diagram showing the value of a sep-type variable K with respect to each PE (processing element)
FIG. 11 is a diagram showing a distribution method of binarization errors.

Next, the remainder obtained by dividing (L-PENUM) by 128 is substituted for a sep-type variable K, and such a substitution operation is performed by the respective PE's in parallel. Here, the symbol PENUM indicates a system constant that 0 is allocated to the processor element PE0, 1 is allocated to the PE1, . . . , and 127 is allocated to the PE127, and the value of the sep-type variable K corresponding to each PE is calculated according to the value of L as shown in FIG. 10.

Next, the flow advances to Step-4 to judge in parallel whether or not PENUM=0 and BLK=0 in the respective PE's. If judged that PENUM=0 and BLK=0, the flow advances to Step-5, while if not judged that PENUM=0 and BLK=0, the flow advances to Step-6. Here, PENUM=0 indicates the system constant allocated to the processor element PE0, the system constant PENUM allocated to the processor element other then PE0 does not become equivalent to 0, and the process in Step-6 is always performed in the processor elements PE1 to PE127.

In Step-5, 0 is substituted for a sep-type variable ERh corresponding to the processor element PE0, and in Step-6, a sep-type variable ERR'/2 is substituted for the sep-type variable ERh corresponding to the processor elements PE1 to PE127. Here, it should be noted that the variable ERh indicates the distribution value of the binarization error in the main scan direction in the case where the target pixel is binarized, and a later-described variable ERv indicates the error distribution value in the sub scan direction. FIG. 11 shows a distribution method of the binarization error occurred when the target pixel is binarized. Here, symbol ERR indicates the sep-type variable in which the binarization error occurred in case of binarizing the target pixel is stored, ERR/2 is the distribution error ERh in the main scan direction, and the distribution error ERv in the sub scan direction is ERR−ERR/2. Moreover, with respect to each PE in the data calculation processing unit 303, a variable ERR' shown in Step-6 has the same value as that of the variable ERR of the left-adjacent PE. That is, the variable ERR' corresponds to the variable ERR of the PE0 with respect to the PE1, corresponds to the variable ERR of the PE126 with respect to the PE127, and moreover corresponds to the variable ERR of the PE127 with respect to the PE0. Such an operation is performed in a case where all the processor elements PE simultaneously refer to the variable ERR of the adjacent processor elements PE by setting the value of the variable ERR to the PE registers connected like a ring as shown in FIG. 4.

The process in Step-5 corresponds to the process to the headmost pixel in the main scan direction and is to set a predetermined value 0 to the binarization error ERh distributed to the pixels in the main scan direction. As above, by the processes in Step-5 and Step-6, the binarization error ERh to be distributed to the adjacent pixel in the main scan direction is calculated.

Next, in Step-7, it is judged whether or not the sep-type variable K is equal to or smaller than 0, and the flow then advances to Step-8 or Step-9. That is, if the sep-type variable K is equal to or smaller than 0, the flow advances to Step-8 to substitute ERRB[i] for the sep-type variable ERv representing the distribution error for the adjacent pixel in the sub scan direction, while if the sep-type variable K is not equal to or not smaller than 0, the flow advances to Step-9 to substitute ERR−ERR/2 for the sep-type variable ERv. Here, symbol ERRB[i] indicates the variable in which the sub-scan distribution component of the binarization error occurred in the binarization process is stored, and ERRB[i] is provided in the memory 411 of each PE. Moreover, the data to be processed by the PE satisfying BND=0 and K=0 corresponds to the image data of the main-scan headmost line. In this case, since there is no antecedent main-scan line, the edge of the image may be binarized by setting the binarization error ERv distributed from the pixel upper-adjacent to the target pixel to 0. Moreover, if BND is not 0, the sub-scan distribution component of the binarization error set in later-described Step-17 is set to ERv.

In Step-9, each processor element PE calculates ERv being the distribution component of the binarization error occurred from the adjacent pixel in the sub scan direction by referring to the sep-type variable ERR belonging to this PE itself.

Next, in Step-10, the binarization errors ERh and ERv occurred from the adjacent pixel are added to a sep-type variable DATA[K], whereby an error-corrected sep-type variable D is calculated. Here, symbol DATA[K] indicates the input image data stored at the address K (calculated in Step-3) of the memory 411 included in each PE.

Next, it is judged in Step-11 whether or not D is larger then 127. If judged that D is larger than 127, the flow advances to Step-12 to substitute 255 for a sep-type variable OUT, while if judged that D is not larger than 127, the flow advances to Step-13 to substitute 0 for the set-type variable OUT. By the processes in Step-12 and Step-13, the error-corrected eight-bit input image data is binarized to 0 or 255.

Then, it is judged in Step-14 whether or not the sep-type variable K is equal to or larger than 0 and equal to or smaller than 127, and the flow advances to Step-15 or Step-18 according to the judged result. The result of the binarization process calculated by the processor element PE of which the variable K is not within the range of 0 to 127 is discarded because Step-15, Step-16 and Step-17 are not executed.

On the other hand, in Step-15, the binarized data OUT is stored in the area of the data DATA[K] in the memory 411, a variable D-OUT is substituted for the binarization error ERR, and the flow advances to Step-16.

Then, it is judged in Step-16 whether or not K is equal to 127. If judged that K is equal to 127, the flow advances to Step-17, while if judged that K is not equal to 127, the flow advances to Step-18. In Step-17, the distribution value of the binarization error to the pixel data of the headmost line of the adjacent band is stored in ERRB[i], the value obtained by adding 1 to i is divided by 56, and thus obtained remainder is set to i.

Next, in Step-18, 1 is added to L.

Then, the flow advances to Step-19 to judge whether or not L is larger than 127. If judged that L is not larger than 127, the flow advances to Step-20 to add 56 to N. Then, the flow returns to Step-3 through Step-27.

In the processes up to this, as shown in FIG. 10, only in case of the variables corresponding to the PE0, the sep-type variable K is equal to or larger than 0, whereby only the binarization process of the PE0 is available in Step-15. Thus, only the binarization process of the pixel position data (0, 0) indicated by the black background in FIG. 9A ends, whereby the binarized data is stored instead of the input image data. Moreover, with respect to the sep-type variable ERR in which the binarization error is stored, the binarization error is stored in the variable ERR corresponding to the PE0 in Step-15. Then, the flow returns from Step-20 to Step-3 through Step-27. Here, the data to be transferred to the memory 411 of the data calculation processing unit 303 in case of performing the process in Step-3 is as shown in FIG. 9B. In this case, since L=1, then K=1 in the PE0, and K=0 in the PE1, as shown in FIG. 10.

In Step-4, if the judgment for the PE1 is performed, the flow advances to Step-6. In the process of the PE1, the error correction value ERh for the input data (0, 0) is calculated in Step-6 by referring to the binarization error stored in ERR of the PE0 when adjacent Step-15 was executed, that is, by referring to the binarization error ERR, as ERR', occurred when the PE0 binarized the input data (0, 0).

In the process for the PE0 in Step-4, as well as last time, the flow advances to Step-5, whereby ERh corresponding to the PE0 becomes 0.

Next, in Step-7, since the variable K corresponding to the PE0 is 1, the flow with respect to the PE0 advances to Step-9 to calculate ERv by referring to the sep-type variable ERR corresponding to the PE0. The value of ERR used by the PE0 is the binarization error calculated when the PE0 binarized the input data (0, 0) in adjacent Step-15, and ERv calculated by the PE0 in Step-9 corresponds to the binarization error distributed from the input data (0, 0) to the input data (1, 0).

Moreover, since the variable K corresponding to the PE1 is 0, the flow with respect to the PE1 advances from Step-7 to Step-8. In Step-8, since the sep-type variable i=0 and ERRB[i]=0, the initial setting value 0 is set to ERv.

Then, the processor element having the variable K judged in Step-14 to be equal to or larger than 0 and equal to or smaller than 127 is the PE0 and the PE1, whereby the variable OUT in which the binarization results calculated by the PE0 and the PE1 have been stored is stored as the valid binarization result at the address where the input image data (1, 0) and (0, 1) shown in FIG. 9B have been stored in Step-15. As above, in case of L=1, the two processor elements PE0 and PE1 simultaneously perform the binarization processes of the input image data. Moreover, 1 is added to L in Step-18, and the above flow is repeated.

As explained above, according as the addition to L is performed, the number of processor elements calculating the valid binarization results increases.

Next, a case where, by L=127, the flow advances to Step-3 through Step-27 will be explained.

In case of L=127, the pixel arrangement of the internal memory 411 after the 128 pixel data at the line memory address N were transferred in Step-3 is shown in FIG. 9C. At this time, the value of the sep-type variable K is equal to or larger than 0 and equal to or smaller than 127 for all the PE's (PE0 to PE127) as shown in FIG. 10, whereby all the PE's calculate the valid binarization results in parallel. Here, the pixel positions where the PE's perform the binarization process in parallel are shown by the oblique line in FIG. 9C. When the flow advances to Step-16 in case of L=127, since the variable K for the processor element PE0 is equal to 127, the flow advances from Step-16 to Step-17 to perform the process for the PE0. That is, in Step-17, the sub-scan distribution component of the binarization error calculated by the PE0 is calculated and set to ERRB[i]. In this case, since the value of i is 0, the sub-scan distribution component of the binarization error is set to ERRB[0], and 1 is added to the sep-type variable i corresponding to the PE0.

Then, the flow advances from Step-18 to Step-19, and further to Step-21.

In Step-21, the value of the memory 411 at the address (0 in this case) indicated by the remainder obtained by dividing the variable L by 128 is transferred to the corresponding line address of the working memory 216. Here, as shown in FIG. 9C, the corresponding line address is coincident with the line address at which the image data (0, 0) to (0, 127) corresponding to the binarized original image data set at the address 0 of the memory 411 have been stored. In this case, the line address 0 of the working memory is set as the address of the transfer destination. Since the image data are transferred in parallel from the memory 411 to the working memory 216 by the respective PE', the binarized image data of the 128 pixels as shown in FIG. 9C are transferred to the working memory, and the corresponding binarized image data are overwritten in the respective areas of the working memory 216 in which the input image data (0, 0) to (0, 127) of the 128 pixels have been stored.

Then, the flow advances to Step-22 to judge whether or not the remainder obtained by dividing the variable L by 128 is 0. In this case, since L=128, the flow further advances to Step-23. In Step-23, BLK is set to BLK=1, and the flow advances to Step-26 through Step-24. In Step-26, the value of BLK+BND×56×128 is substituted for N, and it becomes N=1 in this case. Then, the flow returns to Step-3 through Step-26 and Step-27, and the above process is repeated.

In Step-3, the data corresponding to the line address 1 of the working memory is transferred to the address 0 of the internal memory 411. The contents of the internal memory at this time are shown in FIG. 9D.

As shown in FIG. 9D, the data of the 128 to 255 pixels at the headmost line of the original image data are stored at the address 0 of the internal memory.

Figure 12:
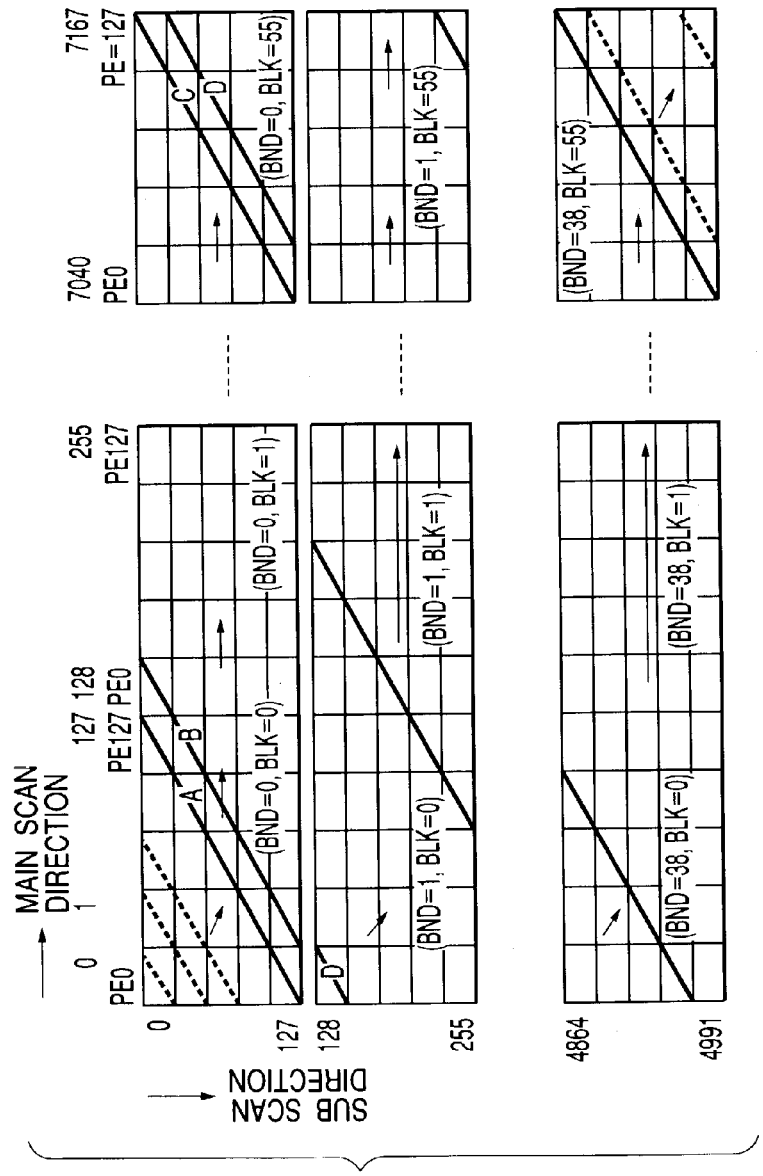
FIG. 12 is a diagram for explaining the binarization process according to the embodiment.

Moreover, from the value of the variable K of each PE corresponding to L=128 shown in FIG. 10, the arrangement of the original image data to be binarized in parallel by the respective PE's in this case corresponds to the line indicated in FIG. 9D, or a line B (128 pixels) in FIG. 12. In such a case, in Step-6, the main-scan distribution value of the binarization error for the pixel data (0, 128) handled by the PE0 is set to ERh by referring to, as ERR', the variable ERR in which the binarization error of the PE127 has been stored, with use of the PE register connected on the ring shown in FIG. 4. Moreover, in Step-17, the sub-scan distribution value of the binarization error is set to ERRB[0] corresponding to the PE1.

The process is repeated according to the above operation.

Next, the image data transferred to the internal memory 411 in case of L=7167 is shown in FIG. 9E. The arrangement of the original image data to be binarized in parallel by the respective PE's in this case corresponds to the line indicated in FIG. 9E, or a line C (128 pixels) in FIG. 12. In case of L=7167, when the flow advances from Step-3 to Step-21 through various processes, the binarized image data of the 128 pixels at the address 0 of the internal memory 411 are transferred to the corresponding line address of the working memory 216. Thus, the binarization process of the first one line of the 7168 pixels of the original image data completes.

Moreover, the flow advances to Step-22, and further advances to Step-23 if L=(7167+1)%128=0 in Step-22. In Step-23 and Step-24, if BLK=(55+1)%56=0, the flow advances to Step-25 to add 1 to BND. Then, the flow advances to Step-26 to set N=BND×56×128. In this case, since it becomes BND=1, N=7168 is set, and the flow further advances to Step-3 through Step-27. The image data transferred to the internal memory 411 after the process in Step-3 was performed is shown in FIG. 9F. As shown in FIG. 9F, the image data from the headmost to 128 pixels the 128th line of the original image data are set at the address 0 of the internal memory 411.

Moreover, the flow advances to Step-7. Here, since the sep-type variable K for the PE0 is K=0, the flow further advances to Step-8 for the PE0 to set ERRB[0] corresponding to the PE0 to ERv as the binarization error distributed from the sub-scan adjacent pixel. The obtained value corresponds to the binarization error to be distributed to the adjacent pixel in the sub scan direction set to ERRB[0] corresponding to the PE0 in Step-17 when the image data on a line A of FIG. 12 is binarized.

Similarly, when the headmost line of BND=1 is processed, the respective PE's use ERRB[0] being the binarization error distributed from the corresponding sub-scan adjacent pixel, whereby the binarization error is diffused from the pixels of the last line of BND=0 to the pixels of the headmost line of BND=1. By repeating this, the binarization error is diffused from the last-line pixel of BND to the headmost pixel of BND+1 being the sub-scan adjacent pixel.

The above process is repeated. Thus, the image data transferred to the internal memory 411 in case of L=279551 is shown in FIG. 9G, and the image data transferred to the internal memory 411 in case of L=279552 is shown in FIG. 9H. Both the processes for obtaining these image data are the processes to the last block of BND=38 and BLK=55. In case of L=279551, all of the PE0 to the PE127 perform the valid binarization process, while in case of L=279552, the binarization process is performed by the PE0 for invalid pixels. Hereafter, the PE's for binarizing the invalid pixels increase.

Next, the image data transferred to the internal memory 411 in case of L=279678 is shown in FIG. 9I.

In this case, only the PE127 performs the valid binarization process. In the flow including this process, if it is judged in Step-27 that L=(279678+1)=279679, the flow ends.

As described above, the binarization process of the 7168× 4992 pixels corresponding to one A4 original image ends, and the binarization result is stored in the working memory 216.

Figure 13:
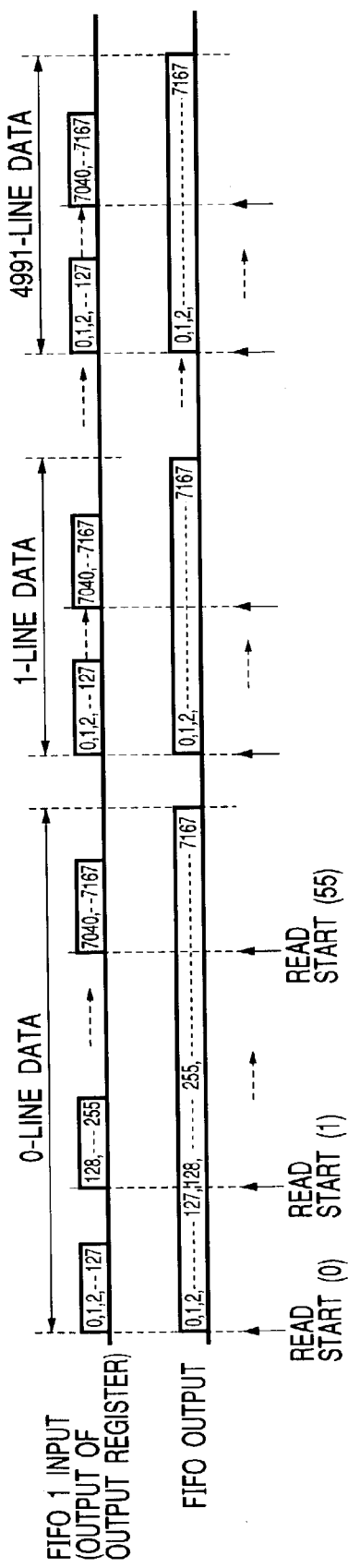
FIG. 13 is a diagram for explaining the operation of an FIFO memory 307.

The binarized image data stored in the working memory 216 is output to the output register 304 through the external memory I/F 306 of the calculation processing unit 300 shown in FIG. 3. Then, the binarized image data read from the working memory 216 is written from the output register 304 to the FIFO memory 307. The relation of the data writing/reading to/from the FIFO memory 307 is shown in FIG. 13.

The FIFO memory 307 is the line memory having the capacity of one line (7168 pixels), and the image data output from the output register 304 is written in the FIFO memory 307 in response to a clock output from the calculation processing unit 300. Here, it should be noted that a read clock is the clock synchronous with the operation of the image formation unit (engine) 205. In the present embodiment, the write clock to the FIFO memory 307 is set to 100 MHz and the read clock from the FIFO memory 307 is set to 20 MHz, so that the write clock is faster than the read clock. After the image data of the $0^{th}$ pixel is written in the FIFO memory 307, the read operation of the image data of the $0^{th}$ pixel is started at timing of read start (0). As shown in FIG. 13, the writing of the binarized image data in the FIFO memory 307 is performed with respect to every 128 pixels, and the reading is performed so that the continuous image data are generated for each line, in synchronism with the operation of the image formation unit 205.

The binarized image data read from the FIFO memory 307 is input to the image formation unit 205, whereby the image formation unit 205 performs the print process according to the input data.

Thus, the A4 original image data read by the reading unit 201 is binarized, whereby the print output can be obtained.

In the present embodiment, as shown in FIG. 7, although the image data of one line read by the reading unit 201 are stored at the continuous 56 addresses, the storage address is not limited to this. That is, as shown in FIG. 14, the continuous lines may be stored, with respect to every 128 pixels, at the continuous addresses from the headmost line in the main scan direction.

Moreover, in a case where the operation clock of the image processor 204 is sufficiently fast as compared with the image clock speed input from the reading unit 201 to the image processor 304 and thus a real-time process can be achieved, the image data read by the reading unit 201 may not be stored in the working memory 216 but may be binarized. In this case, the image data input from the input register 302 shown in FIG. 3 may be captured in the internal memory 411 of the data calculation processing unit 303, and the data at the pixel position in the memory 411 to which the binarization process ended may be rewritten by the binarization data. Thus, it is possible to cause the image formation unit 205 to output the binarized data stored in the memory 411 through the output register from the time point when the binarization process of one band shown in FIG. 12 ends.

Figure 15:
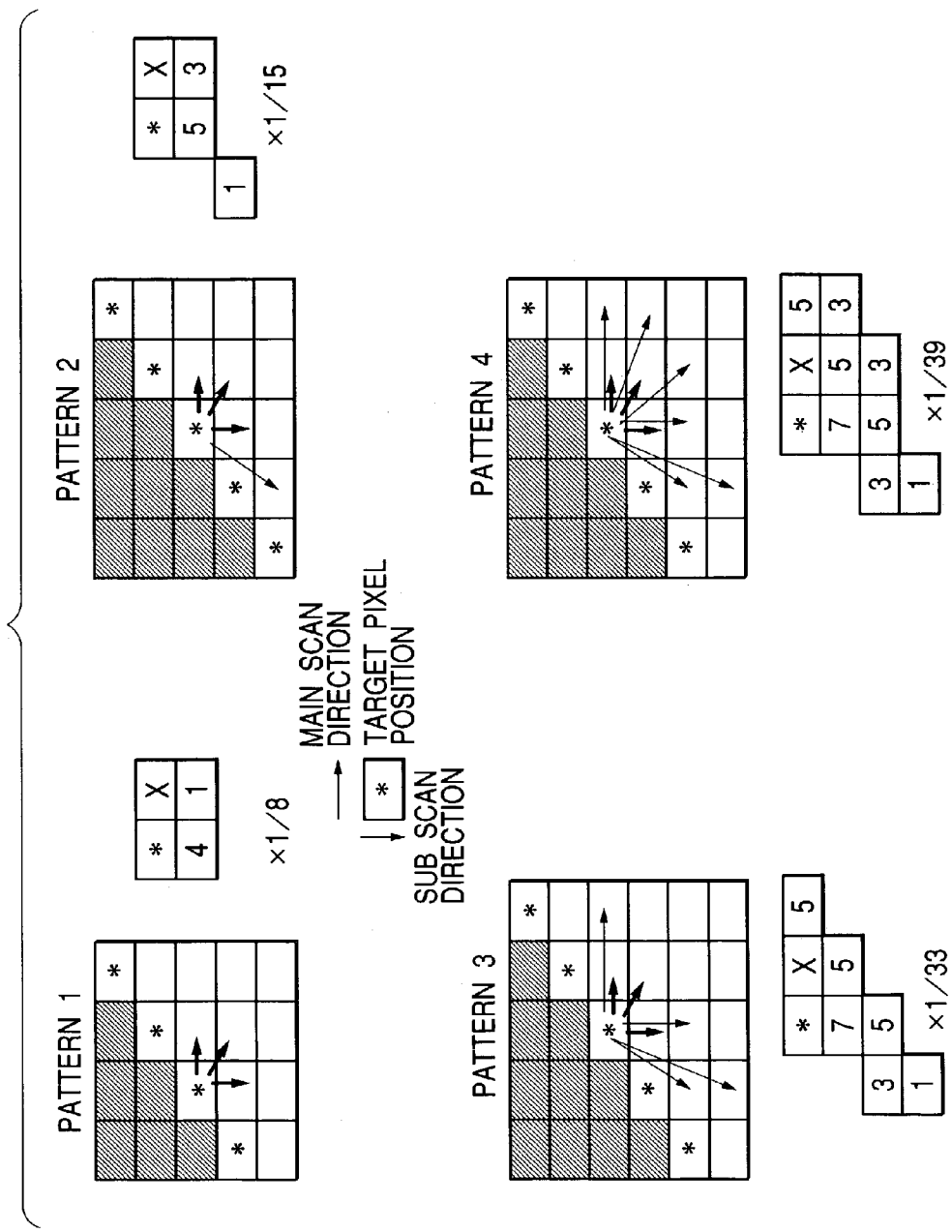
FIG. 15 is a diagram showing a distribution method of the binarization errors.

Moreover, although the error data in the error diffusion process according to the present embodiment is distributed to one pixel in each of the main and scan directions shown in FIG. 11, the error diffusion method is not limited to this. That is, it is apparent that a case as shown in FIG. 15 is applicable. FIG. 15 shows examples of distributing the error respectively to three pixels (pattern 1), four pixels (pattern 2), seven pixels (pattern 3) and nine pixels (pattern 4), and also shows examples of error distribution rates to each pixel position. However, it is of course apparent that these examples are not limited to those shown in FIG. 15. Here, it should be noted that, in FIG. 15, symbol * indicates the target pixel positions that the respective PE's intend to process simultaneously. If the error is distributed to about ten pixels adjacent to the target pixel position (not including the pixel at the target pixel position itself), a satisfactory image can be obtained.

Moreover, it should be noted that symbol X indicates the pixel position that the calculation error occurred in the calculation for distributing the error is absorbed, and the remainder error obtained by subtracting the summation of the distribution errors to other pixels from the summation of the errors is allocated to that position.

When the errors are distributed according to the patterns shown in FIG. 15, several bytes of the previously explained connection error ERRB is necessary for each band in each PE.

As explained above, according to the first embodiment of the present invention, the error diffusion process which is the typical example of the sequential process can be performed by using the SIMD processor without using any auxiliary processor for the sequential process, whereby there is an effect that the cost necessary for the auxiliary processor can be reduced.

Moreover, even if the two-dimensional image data of which the number of one-line pixels and the number of lines exceed the number of the processor elements included in the SIMD processor is input, the two-dimensional image data is divided and stored in the memory of the SIMD processor, and the stored image data are processed respectively. Thus, it is possible to supply the image data of the different pixel position to each processor element and thus cause the respective processor elements to operate in parallel, whereby it is possible to achieve a high-speed process by effectively using the parallel process capability of the SIMD processor.

Moreover, according to the present embodiment, the error occurred in the error diffusion process is distributed between the divided data areas, and then the error correction process is performed. Thus, there is an effect that a high-quality image which has been error-diffusion-processed and satisfactorily preserves the density of the input signal can be obtained.

Second Embodiment

In the second embodiment, a modified example of a pixel position for diffusion of error data generated in an error diffusion process to obtain a further high-quality image will be explained.

Figure 16A:
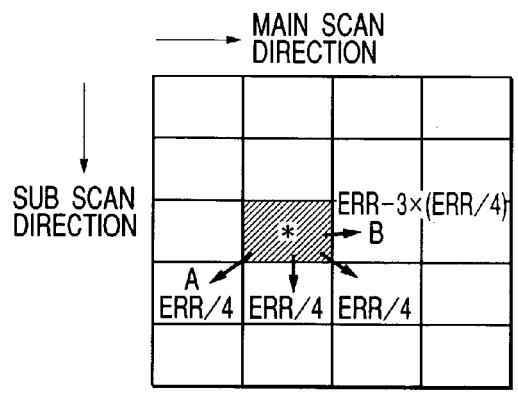
FIGS. 16A and 16B are diagrams showing a distribution method of binarization errors, in the second embodiment.
Figure 16B:
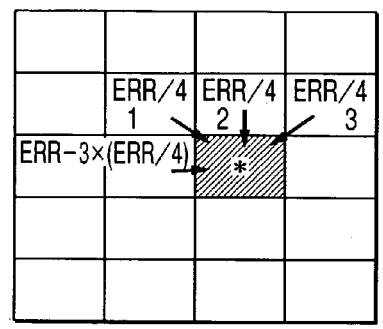

FIGS. 16A and 16B show the pixel position of the diffused error data in the second embodiment.

The second embodiment is applied to a case where an error is diffused to the pixel position which is the lower left oblique position (FIG. 16A) adjacent to a target pixel and is not included in the examples of the error data diffusion positions shown in FIGS. 11 and 15.

Figure 17:
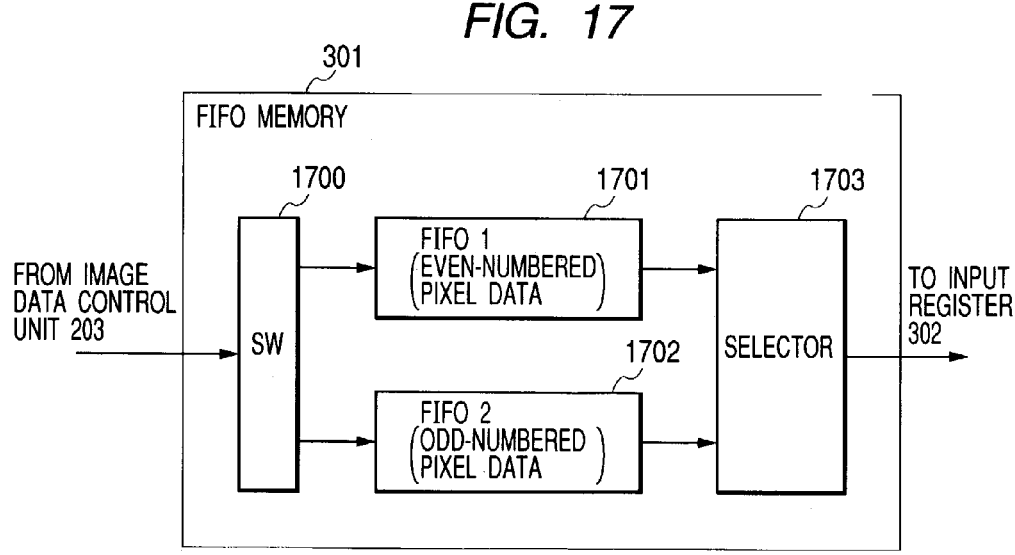
FIG. 17 is a block diagram showing the structure of the FIFO memory 301.
Figure 18:
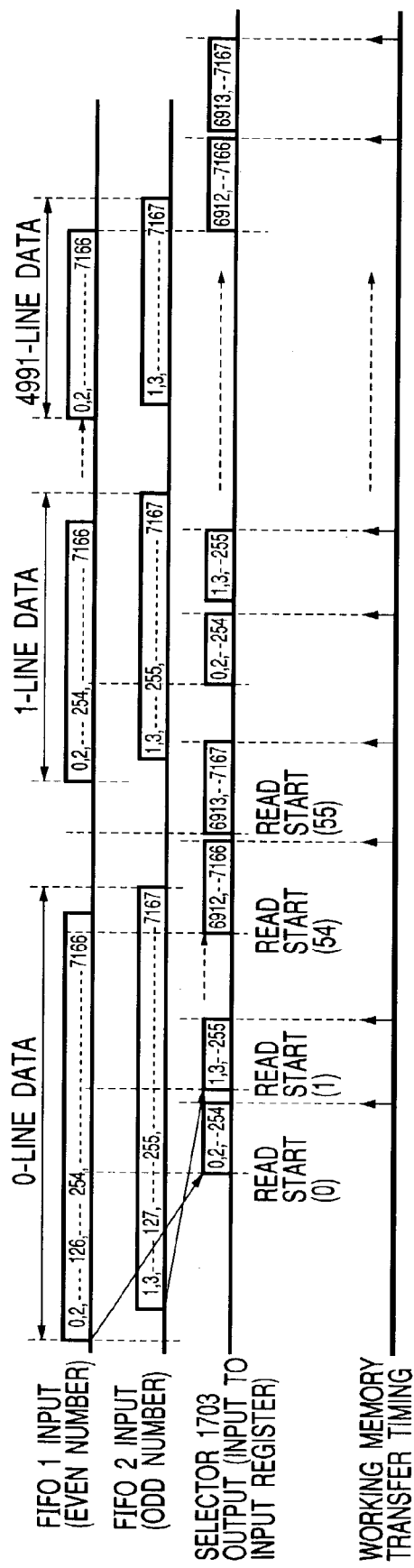
FIG. 18 is a timing chart for explaining the operation of the FIFO memory 301.

As well as the first embodiment, the original image data shown in FIG. 5 is input to the FIFO memory 301 shown in FIG. 3. Then, in the present embodiment, one-line data consisting of 7168 pixels is divided into the data of the even-numbered pixels and the data of the odd-numbered pixels, and the divided data are input to the input register 302 of the calculation processing unit 300. FIG. 17 shows the structure of the FIFO memory 301, and FIG. 18 shows the relation of the image data input/output to/from the FIFO memory 301. In FIG. 17, numeral 1700 denotes a switch (selector) which divides the original image data input from the image data control unit 203 into the image (pixel) data of the even-numbered pixels and the image (pixel) data of the odd-numbered pixels, numeral 1701 denotes an FIFO 1 memory to which the image data of the even-numbered pixels output from the selector 1700 are input, numeral 1702 denotes an FIFO 2 memory to which the image data of the odd-numbered pixels output from the selector 1700 are input, and numeral 1703 denotes a selector which outputs either the input data from the FIFO 1 memory 1701 or the input data from the FIFO 2 memory 1702. Then, the output signal of the selector 1703 is input to the input register 302 shown in FIG. 3.

FIG. 18 is the timing chart for explaining the operation of the FIFO memory 301 shown in FIG. 17. The one-line data consisting of the 7168 pixels is input from the image data control unit 203 to the switch 1700 in the order beginning from the $0^{th}$ pixel of the $0^{th}$ line, whereby the pixel data 0, 2, 4, ..., 7166 of the even-numbered pixels are written in the FIFO 1 memory 1701 and the pixel data 1, 3, 5, ..., 7167 of the odd-numbered pixels are written in the FIFO 2 memory 1702 in response to a clock synchronous with the original image data. If the writing of the image data of the 128 pixels 0 to 254 in the FIFO 1 memory 1701 ends, the reading of the image data of the 128 pixels from the FIFO 1 memory 1701 starts at read start timing (0), and the read image data is stored in the input register 302 through the selector 1703. Here, it should be noted that the read clocks for the FIFO 1 memory 1701 and the FIFO 2 memory 1702 are output from the calculation processing unit 300, and as same as the clocks in the first embodiment, the read clock is faster than the write clock.

If the reading of the image data of the 128 pixels 0 to 254 from the FIFO 1 memory 1701 ends, then the reading of the image data of the 128 pixels 1 to 255 of the original image data from the FIFO 2 memory 1702 starts, and the image data of the odd-numbered pixels read from the FIFO 2 memory 1702 are input to the input register 202 through the selector 1703. If the reading of the image data of the 128 pixels from the FIFO 2 memory 1702 ends, then the reading of the original image data of the 128 pixels from the FIFO 1 memory 1701 again starts, whereby the original image data 256, 258, ..., 510 are input to the input register 202 through the selector 1703. Subsequently, by repeating the similar operation, the original image data of the even-numbered 128 pixels and the odd-numbered 128 pixels are alternately input to the input register 302 and then stored in the working memory 216 as previously explained. FIG. 19 shows the relation between the original image data stored in the working memory 216 and the addresses of the working memory 216. As shown in FIG. 19, in the working memory 216, the image data of the even number and the image data of the odd number are stored with respect to every 128 pixels in sequence.

Figure 20A:
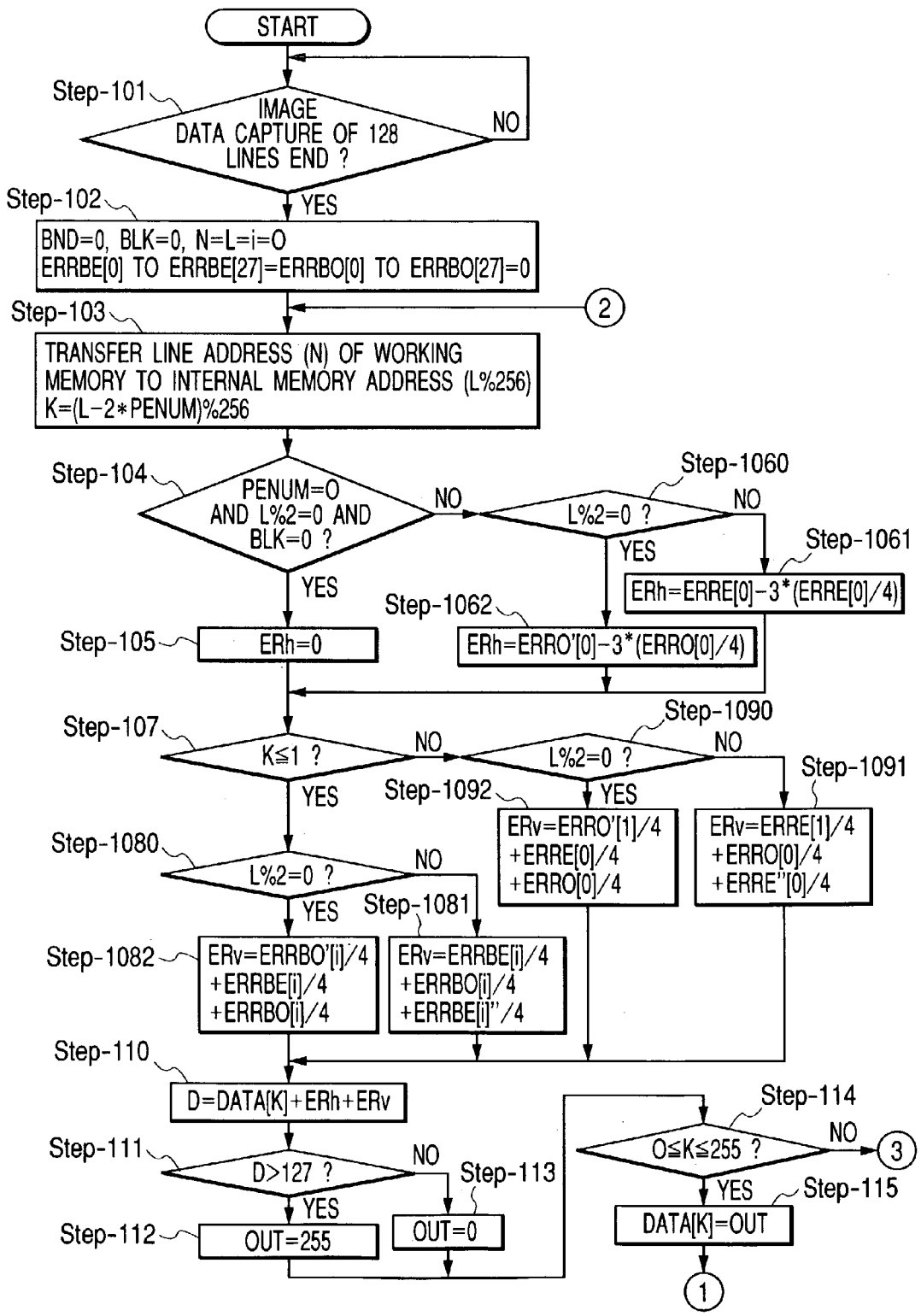
FIG. 20 which is composed of FIGS. 20A and 20B is a flow chart showing the process according to the second embodiment.
Figure 20B:
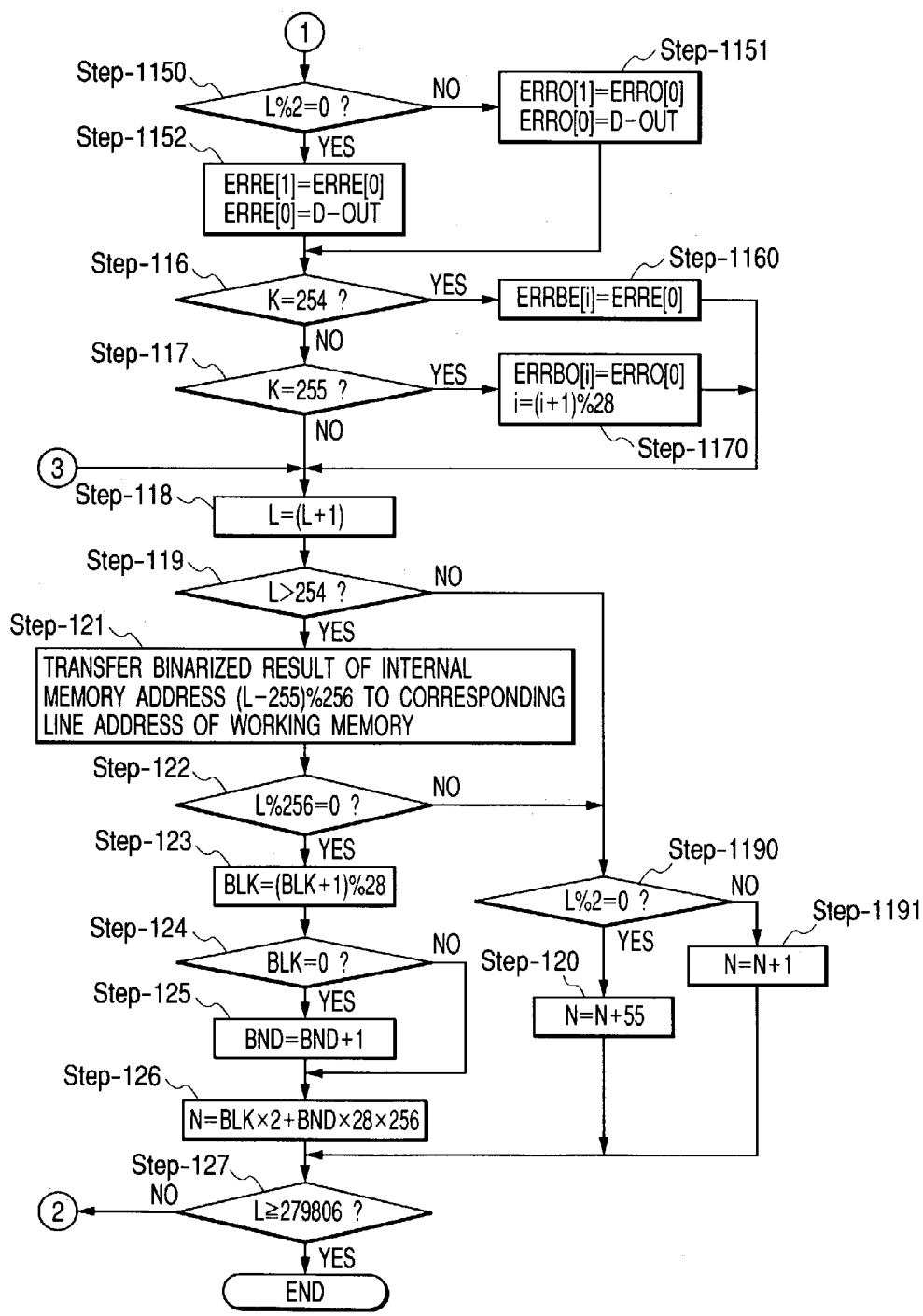

Hereinafter, the operation of the second embodiment will be explained in detail with reference to a flow chart shown in FIG. 20 composed of FIGS. 20A and 20B. Here, it should be noted that the explanation of the operation which overlapping the operation already explained in FIG. 8 according to the first embodiment will be simplified.

In Step-101, it waits until input image data of 128 lines are captured or fetched in the working memory 216. If the capture of the input image data of the 128 lines in the working memory 216 ends, the flow advances to Step-102 to initialize variables.

In Step-102, a variable N (line address of working memory), a variable L (the number of data transfer), a variable BND (band), and a variable BLK (block) are initialized, and further a sep-type variable i (an index of connection error), sep-type variables ERRBE[0] to ERRBE[27] (28 connection error data for even-numbered pixels), and sep-type variables ERRBO[0] to ERRBO[27] (28 connection error data for odd-numbered pixels) are initialized. Here, BND (band) indicates the variable obtained by setting the 128 lines in the sub scan direction of the input image data as one band, and BLK (block) indicates the variable obtained by setting the 256 pixels in the main scan direction of the input image data as one block. With respect to the A4 original image data of which the number of main-scan pixels is 7168 and the number of sub-scan lines is 4992, BND has the values of 0 to 38, and BLK and i have the values of 0 to 27. Moreover, the sep-type variables ERRBE[0] to ERRBE[27] and the sep-type variables ERRBO[0] to ERRBO[27] indicate the memories for storing the binarization errors occurred in the binarization process of the last line of each band, and each PE includes the 28 memories being the same as the number of blocks. Moreover, the binarization error is diffused to the four pixels on the periphery of the target pixel, as shown in FIG. 16A. That is, ¼ of the binarization error occurred from the target pixel is diffused to each of the lower right oblique pixel, the lower left oblique pixel and the lower pixel, and the remainder of the binarization error after the error diffusion to these three pixels ended is diffused to the pixel right adjacent to the target pixel.

Next, in Step-103, the image data of the 128 pixels of the line address N of the working memory 216 are transferred to an address L %256 of the memory 411 included in each PE of the data calculation processing unit 303, and the sep-type variable K is calculated. The relation of the calculated value of the sep-type variable K and the variable K is shown in FIG. 21. In FIG. 21, the PE's of which the value of K is equal to or higher than 0 and equal to or smaller than 255 perform the valid binarization process, and the binarized data calculated by the PE's other than the above valid PE's are discarded as invalid data. Moreover, it is controlled that that the PE of which K is even number processes the even-numbered image data in the main scan direction and the PE of which K is odd number processes the odd-numbered image data in the main scan direction. Thus, the PE of which K=0 processes the image data at the even-numbered pixel positions in the headmost line of each BND, the PE of which K=1 processes the image data at the odd-numbered pixel positions in the headmost line of each BND, the PE of which K=254 processes the image data at the even-numbered pixel positions in the last line of each BND, and the PE of which K=255 processes the image data at the odd-numbered pixel positions in the last line of each BND.

Next, the flow advances to Step-104 to judge whether or not PENUM=0, L %2=0 and BLK=0. If judged that PENUM=0, L %2=0 and BLK=0, the flow advances to Step-105, while if not judged that PENUM 0, L%2=0 and BLK=0, the flow advances to Step-1060. In Step-105, 0 is substituted for a sep-type variable ERh corresponding to the processor element PE0, and in Step-1060, it is judged whether or not L %2=0. Here, it should be noted that L %2=0 corresponds to the case where L is even number, and the flow advances to Step-1062 if L is even number.

Here, the sep-type variables ERRE[0], ERRE[1], ERRO[0] and ERRO[1] used in the following steps will be explained.

In the present embodiment, as later described, it is controlled that each PE binarizes the data of the two pixels successive in the main scan direction, and the sep-type variables ERRE[0], ERRE[1], ERRO[0] and ERRO[1] are used as the areas where the binarization errors occurred when the respective PE's perform the binarization process are stored. That is, the binarization errors occurred when each PE processes the even-numbered pixel data are stored in the sep-type variables ERRE[0] and ERRE[1], that is, the binarization error of the even-numbered pixel data processed immediately before is stored in the sep-type variable ERRE[0], and the binarization error of the even-numbered pixel data processed before that is stored in the sep-type variable ERRE[1]. Similarly, the binarization errors occurred when each PE processes the odd-numbered pixel data are stored in the sep-type variables ERRO[0] and ERRO[1]. Moreover, ERRE'[0] and ERRE'[1] respectively correspond to ERRE[0] and ERRE[1] that the left-adjacent PE has, and ERRE"[0] and ERRE"[1] respectively correspond to ERRE[0] and ERRE[1] that the right-adjacent PE has. Similarly, ERRO'[0] and ERRO'[1] respectively correspond to ERRO[0] and ERRO[1] that the left-adjacent PE has, and ERRO"[0] and ERRO"[1] respectively correspond to ERRO[0] and ERRO[1] that the right-adjacent PE has. As well as the explanation of the first embodiment, the PE127 corresponds to the PE left-adjacent to the PE0, and the PE0 corresponds to the PE right-adjacent to the PE127. In Step-105, Step-1061 and Step-1062, for each PE, the binarization error distributed from the left-adjacent pixel is substituted for ERh. Step-105 is the step to be executed when the main-scan headmost pixel of the original image data is processed, and the distributed error from the left-adjacent pixel is set to 0 in this case.

Next, in Step-107, it is judged whether or not the sep-type variable K is equal to or smaller than 1. That is, if the sep-type variable K is not equal to or smaller than 1, the flow advances to Step-1090, and either Step-1091 or Step-1092 is executed according to whether L is odd number or even number. Here, Step-1091 and Step-1092 are respectively the steps to substitute the summation of the binarization error data distributed from pixel positions 1, 2 and 3 shown in FIG. 16B for ERv. If judged in Step-107 that K is equal to or smaller than 1, the flow advances to Step-1080, and either Step-1081 or Step-1082 is executed according to whether L is odd number or even number. Here, Step-1081 and Step-1082 are respectively the steps to be executed when the image data of the first main-scan line of each band is processed, that is, the distribution error to the image data of the first main-scan line of each band is calculated by referring to the binarization error occurred when the image data of the main-scan last line of the previous band was processed. Incidentally, for the image data of the main-scan headmost line of the first band, since there is no binarization error distributed from the image data of an antecedent main-scan line, then it is controlled that ERv calculated in Step-1081 and Step-1082 is set to 0. Moreover, in the headmost block in each band, the positions of the even-numbered pixels to be processed by the PE0 correspond to the main-scan headmost pixel. In this case, since there is no pixel to which the binarization error is to be distributed from the direction 1 of FIG. 16B, it may be controlled that ERRO'[1]/4 in Step-1092 is set to 0 and ERRBO'[i]/4 in Step-1082 is set to 0 to perform the binarization process at the edge of the image.

Then, in Step-110, the binarization errors ERh and ERv occurred from the adjacent pixel are added to the sep-type variable DATA[K], thereby calculating an error-corrected sep-type variable D. Here, it should be noted that DATA[K] indicates the input image data stored at the address K of the memory 411 of each PE.

Next, the binarization process is performed in Step-111, Step-112 and Step-113, and it is then judged in Step-114 whether or not K is equal to or larger than 0 and equal to or smaller than 255. If judged that K is not equal to or larger than 0 and equal to or smaller than 255, the flow advances to Step-118 to discard the binarization result. On the other hand, in Step-115, the binarized data OUT is stored in the area of DATA[K] of the memory 411, and the flow advances to Step-1150.

In Step-1150, it is judged whether L is odd number or even number. If K is odd number, the flow advances to Step-1151 to substitute ERRO[0] for ERRO[1], and further substitute the binarization error D-OUT for ERRO[0]. On the other hand, if K is even number, the flow advances to Step-1152 to substitute ERRE[0] for ERRE[1], and further substitute the binarization error D-OUT for ERRE[0]. Although later described, the pixel position that each PE performs the process if L is even number corresponds to the even-numbered pixel position in the main scan direction, while the pixel position that each PE performs the process if L is odd number corresponds to the odd-numbered pixel position in the main scan direction. Thus, in Step-1151 and Step-1152, the binarization error according to the pixel position that the process is performed is stored.

Next, it is judged in Step-116 whether or not K is 254. If judged that K is equivalent to 254, the flow advances to Step-1160 to substitute the binarization error ERRE[0] for ERRBE[i], and the flow further advances to Step-118. On the other hand, in Step-117, it is judged whether or not K is 255. If judged that K is equivalent to 255, the flow advances to Step-1170 to substitute the binarization error ERRO[0] for ERRBE[i], add 1 to i, and substitute the remainder obtained by dividing the added value by 28 for i, and thereafter the flow advances to Step-118. The pixel position that the PE of which K=254 performs the process is the even-numbered pixel position of the main-scan last line of each BND, and the pixel position that the PE of which K=255 performs the process is the odd-numbered pixel position of the main-scan last line of each BND. Thus, in Step-1160 and Step-1170, the binarization error occurred when the image data of the main-scan last line of each BND is processed is stored in ERRBE[i] and ERRBO[i].

Next, 1 is added to L in Step-118, and it is then judged in Step-119 whether or not L is larger than 254. If L is not larger than 254, the flow advances to Step-1190 to further judge whether L is odd number or even number. Then, the flow advances to Step-120 if L is even number, and advances to Step-1191 if L is odd number. Here, it should be noted that L to be judged corresponds to the line number to be next processed, whereby 1 is added to N if the line to be next process is the odd-numbered line, while 55 is added to N if the line to be next process is the even-numbered line. Moreover, it should be noted that the value of N is the address of the working memory to be transferred to the internal memory in the process of Step-103, and the addresses are sequentially changed.

Next, the flow advances to Step-127, and further advances to Step-103 to repeat the process.

Here, the operation in the case where the process in and after Step-103 is repeated after the initialization process in Step-102 was performed will be explained. FIGS. 22A to 22I are diagrams showing the contents of the internal memory 411 according to the value of L. FIG. 22A shows a case where L=0. When the process in Step-103 is performed for the first time, since N=L=0, the data of the 128 pixels at the line address 0 of the working memory are transferred to the address 0 of the internal memory 411. Moreover, as shown in FIG. 21, since the PE which has the value of K equal to or larger than 0 and equal to or smaller than 255 in case of L=0 is only the PE0, only the PE0 performs the valid binarization process in case of L=0. Moreover, for the PE0, the binarization error ERh distributed from the left-adjacent pixel in the main scan direction in Step-105 is set to 0, and is the headmost-line pixel data of headmost BND as described above (although not shown in Step-1082), whereby ERv is also set to 0 in this case.

In Step-110, since K=0, the PE0 substitutes the data of the internal address 0 and the image data (0, 0) of the original image data for D, and then the binarization process is performed in Step-111, Step-112 and Step-113. Moreover, in Step-115, the binarization result is substituted for the internal address 0. Next, in Step-1152, the binarization error is stored in ERRE[0].

Thus, as shown in FIG. 22A, in case of L=0, the binarization result of only the data (0, 0) of the original image data is stored at the address 0 of the internal memory 411. Then, the flow advances to Step-118 to set L=1, and further advances up to Step-1191 to add 1 to N.

Thus, the content of the internal memory 411 in a case where the process in Step-103 is again performed is shown in FIG. 22B. In this case, since N=1, the data of the 128 pixels at the line address 1 of the working memory shown in FIG. 19 are transferred to the internal memory. As shown in FIG. 21, also in this case, the PE which has the valid K value is only the PE0, whereby only the PE0 performs the valid binarization process. Then, the flow advances from Step-103 to Step-106 through Step-104 and Step-1060 to substitute ERRE[0]−3*(ERRE[0]/4) for ERh. Here, symbol ERRE[0] to be referred indicates the binarization error occurred in the binarization process that the PE0 first performed, and the binarization error to be distributed from the left-adjacent pixel as indicated by an arrow B in FIG. 16A is performed. Then, the flow advances to Step-115 to substitute the binarization result calculated by the PE0 for the internal address 1, and the flow further advances to Step-1151 to store the binarization error in ERRO[0].

In Step-118, 1 is added to L, whereby L=2, and the flow advances to Step-120 through Step-119 and Step-1190. Here, 55 is added to N, whereby N=56, and the flow further advances to Step-103 to transfer the 128 pixel data at the line address N=56 of the working memory to the address 2 of the internal memory 411. Moreover, as shown in FIG. 21, the variable K of the PE1 becomes 0, whereby the PE1 becomes the PE which performs the valid binarization process. Thus, by repeating the above process, the number of PE's which calculate the valid binarization result increases, whereby all of the PE0 to the PE127 calculate the valid binarization result when L=254. As explained in the first embodiment, since the PE0 to PE127 are the processor elements which operate in parallel, all of the PE0 to PE127 simultaneously perform the valid binarization process when L=254 and after.

Then, FIG. 23 shows the arrangement of the original image data to which the binarization process is performed according to an increase of L and the order of the binarization processes. In FIG. 2, the original image data below the PE0 to PE127 indicate the pixel positions where the corresponding same PE performs the process, and also indicate the above-described relation between BND and BLK. Each BND corresponds to the 128 lines of the original image data, and each BLK corresponds to the number of main-scan pixels (256 pixels).

Here, the binarization data to be processed in case of L=0 is the data at the pixel position indicated by 0 in FIG. 23, and this corresponds to the position data (0, 0) of the original image.

The binarization data to be processed in case of L=1 is the data at the pixel position indicated by 1 in FIG. 23, and this corresponds to the position data (0, 1) of the original image.

Moreover, the binarization data to be processed in case of L=2 is the data at the pixel position indicated by 2 in FIG. 23, and this corresponds to the position data (1, 0) and (0, 2) of the original image.

After than, in the same way, the value of M is described in the pixel position data of the original image to be processed in case of L=M. As shown in FIG. 23, in the present embodiment, a set of the main-scan original image data of the two pixels is processed by the same PE. In FIG. 23, when L=0, 1, the PE which performs the valid binarization process is only the PE0. However, as L increases, the number of PE's which perform the valid binarization process increases, whereby all of the 128 PE's perform the valid binarization process when L=254 and after.

Here, the distribution of the binarization error to the image data to be processed when L=5 in FIG. 23 will be explained in detail. The image data to be processed when L=5 is the data at the pixel position numbered as 5 in FIG. 23. Then, if it pays notice to the pixel position numbered as 5, the numbers of the pixel position data of the four pixels on the periphery of the target pixel position shown in FIG. 16B are all smaller than 5, whereby it is understood that the binarization process to these positions has already ended.

The error distributed from the pixel position numbered as 4 of the left-adjacent pixel is calculated in Step-1060 as ERh=ERRE[0]−3* (ERRE[0]/4). The binarization process at the left-adjacent pixel position numbered as 4 in FIG. 23 is the process to the even-numbered image data performed immediately before by the PE of which the number is the same as the PE numbered as 5. Thus, in Step-1601, the binarization error distributed from the left-adjacent pixel is calculated from ERRE[0] (already set in Step-1152) being the binarization error occurred when the even-numbered pixel position of the same PE is processed.

Moreover, in Step-1091, the summation of the binarization errors distributed from the adjacent pixel positions at the upper portion of one line numbered as 2, 3 and 4 in FIG. 23 is calculated as ERv=ERRE[1]/4+ERRO[0]/4+ERRE"[0]/4.

Here, symbol ERRE[1] indicates the binarization error occurred when the pixel position data numbered as 2 in FIG. 23 was processed, and is set in Step-1152 as the binarization error occurred when the same PE processed the even-numbered pixels. Symbol ERRO[0] indicates the binarization error occurred when the pixel position data numbered as 3 in FIG. 23 was processed, and is set in Step-1151 as the binarization error occurred when the same PE processed the odd-numbered pixels immediately before. Moreover, symbol ERRE"[0] indicates the binarization error occurred when the pixel position data numbered as 4 in FIG. 23 was processed, and is set in Step-1151 as the binarization error occurred from the even-numbered pixels which the right-adjacent PE processed immediately before.

Although the above relation is explained with respect to the distribution of the binarization error to the pixel position data numbered as 5 in FIG. 23, this relation is similar to the distribution of the binarization error to the pixel position data to which the odd number in FIG. 23 is added.

Next, the distribution of the binarization error to the pixel position data numbered as 6 in FIG. 23 will be explained. To the pixel position data numbered as 6, the binarization errors occurred when the pixel positions numbered as 3, 4 and 5 were processed have been distributed, and it is understood that the respective binarization processes have already ended.

The distribution error from the pixel position numbered as 5 of the left-adjacent pixel is calculated in Step-1062 as ERh=ERRO'[0]−3* (ERRO'[0]/4). The binarization process at the left-adjacent pixel position numbered as 5 in FIG. 23 is the process to the odd-numbered image data performed immediately before by the PE left-adjacent to the PE numbered as 6. Thus, in Step-1062, the binarization error distributed from the left-adjacent pixel is calculated from ERRO'[0] (already set in Step-1151) being the binarization error occurred when the odd-numbered pixel position of the left-adjacent PE is processed.

Moreover, in Step-1092, the summation of the binarization errors distributed from the adjacent pixel positions at the upper portion of one line numbered as 3, 4 and 5 in FIG. 23 is calculated as ERv=ERRO'[1]/4+ERRE[0]/4+ERRO [0]/4.

Here, symbol ERRO'[1] indicates the binarization error occurred when the pixel position data numbered as 3 in FIG. 23 was processed, and is set in Step-1151 as the binarization error occurred when the left-adjacent PE processed the odd-numbered pixels. Symbol ERRE[0] indicates the binarization error occurred when the pixel position data numbered as 4 in FIG. 23 was processed, and is set in Step-1152 as the binarization error occurred when the same PE processed the even-numbered pixels immediately before. Moreover, symbol ERRO'[0] indicates the binarization error occurred when the pixel position data numbered as 5 in FIG. 23 was processed, and is set in Step-1151 as the binarization error occurred from the odd-numbered pixels which the same PE processed immediately before.

Although the above relation is explained with respect to the distribution of the binarization error to the pixel position data numbered as 6 in FIG. 23, this relation is similar to the distribution of the binarization error to the pixel position data to which the even number in FIG. 23 is added.

Next, the operation in case of L=254 will be explained. If Step-103 is executed when L=254, as shown in FIG. 21, the variable K of the PE127 becomes 0, whereby all the 128 PE's, the PE0 to PE127, perform the valid binarization process. As shown in FIGS. 22D and 23, the pixel position where the PE127 performs the binarization process at this time is the 255$^{th}$ pixel on the first main-scan line, and this corresponds to the data at the position (0, 254) of the original image data. Moreover, the position where the PE0 performs the binarization process corresponds to the data at the position (127, 0) of the original image data. When L=254, since the sep-type variable K of the PE0 is equivalent to 254, the flow advances from Step-116 to Step-1160 to cause the PE0 to perform the process. That is, in Step-1160, ERRE[0] is substituted for ERRBE[0]. Here, symbol ERRE[0] indicates the binarization error of the original image data (127, 0) processed by the PE0 at this time, and this error value is substituted for ERRBE[0] (i=0 at this time). The obtained value indicates the binarization error occurred at the even-numbered pixel position handled by the PE0 in the main-scan last line when BND=0 and BLK=0, as shown by B0 in FIG. 23.

Then, the flow advances to Step-118 to set L=254+1, and further advances to Step-121 through Step-119. Here, the data of the 128 pixels at the address (L−255)%256 of the internal memory 411 are transferred to the corresponding line address of the working memory. In this case, since L=255, the 128 pixel data at the address 0 of the internal memory 411 are to the line address 0 of the working memory. As shown in FIG. 22D, since the binarization process to all the 128 pixel data at the internal address 0 of the internal memory 411 has ended in this case, the binarization results corresponding to the even-numbered original image data (corresponding to the 128 pixels) are transferred from the headmost data in the main scan direction to the working memory. Then, the flow advances to Step-1190 through Step-122. Here, since L=255, then N=N+1=7112+1=7113 in Step-1191, and the process is repeated. In this case, in Step-103, the 128 pixel data at the line address 7113 of the working memory are transferred to the address 255 of the internal memory, and the variable K for the PE0 becomes 255, whereby the subsequent process is repeated. FIG. 22E shows the pixel data arrangement of the internal memory in case of L=255. In this case, the flow concerning the process for the PE0 advances to Step-1170 through Step-117 to substitute ERRO[0] for ERRO[i] (i=0 in this case). Here, ERRO[0] indicates the binarization error of the original image data (127, 1) processed by the PE0 at this time, and this binarization error is substituted fro ERRBO[0]. The obtained value indicates the binarization error occurred at the odd-numbered pixel position handled by the PE0 in the main-scan last line when BND=0 and BLK=0, as shown by B1 in FIG. 23. Moreover, 1 is added to the sep-type variable i of the PE0. Then, the flow advances to Step-118 to set L=255+1=256, and further advances to Step-121 to transfer the binarization result of the first line at the internal memory address to the working memory, and thereafter the flow advances to Step-123 through Step-122 to add 1 to BLK, whereby BLK=1 in this case. Next, the flow advances from Step-124 to Step-126 through Step-125 to set N=1×2+0× 28×256=2, and then the flow advances to Step-103 through Step-127.

In Step-103, since L=256 and N=2, the 128 pixel data stored at the line address 2 of the working memory are transferred to the address 0 of the internal memory. FIG. 22F shows the contents of the internal memory at this time. That is, the 128 pixel data of the even-numbered pixel position from (0, 256) to (0, 512) of the main-scan headmost line of the original image data are stored at the address 0 of the internal memory. Moreover, at this time, since the sep-type variable K for the PE0 is K=0, the PE0 performs the binarization process of the image data at the pixel position (0, 256) of the original image data. That is, the data to be binarized by the PE0 in case of L=256 is the original image data corresponding to the pixel positions of C shown in FIG. 23. More specifically, the original image position to be processed by the PE0 is the headmost pixel of the main-scan headmost line of BND=0 and BLK=1. In this case, the distribution ERh of the binarization error for the pixel position to be processed by the PE0 is calculated from the binarization memory ERRO'[0] of the PE127 in Step-1062. After then, the process is repeated, and the contents of the internal memory in case of L=257 are shown in FIG. 22G.

Hereinafter, the operation in case of L=7167 will be explained. The contents of the internal memory in case of L=7167 will be shown in FIG. 22H. As shown in FIG. 23, the pixel position where each PE performs the process is the block of BND=0 and BLK 27, whereby the PE0 processes the original image data (127, 6915) of the odd-numbered pixel on the main-scan last line. In this case, as well as the above, the flow advances from Step-103 to Step-117. Here, since the sep-type variable K of the PE0 is K=255, the flow further advances to Step-1170. The sep-type variable i belonging to the PE0 in this case is 27 being equivalent to the variable BLK, whereby the binarization error ERRO[0] is stored in ERRO[27], and i=(27+1)%28=0 is set, and the flow further advances to Step-121. In this step, since L=7168 and (L−255)%256=1, the binarization result at the address 1 of the internal memory is transferred to the address 54 of the working memory, and the flow advances to Step-123 through Step-122 because L=7168%256=0. Here, since BLK=(27+1)%28=0, the flow advances to Step-125 through Step-124, whereby BND=BND+1=0+1=1. Moreover, in Step-126, N=BLK×2+BND×28×256=0×2+1×28×256=7168, and the flow advances to Step-103 through Step-127. In Step-103, the 128 pixel data at the line address N=7168 of the working memory are transferred to the address L %256=7168%256=0 of the internal memory. The contents of the internal memory at this time are shown in FIG. 22I.

As shown in FIGS. 22I and 23, the original image data position to be processed by the PE0 at this time is (128, 0) which corresponds to the main-scan headmost image data of the $129^{th}$ line of the original image. Then, the calculation of the binarization errors ERh and ERv at this time will be explained.

If the flow advances from Step-103 to Step-104, since PENUM=0, L=7168 and BLK=1, ERh=0 is set. As shown in FIG. 23, since the original image data to be processed by the PE0 at this time is at the main-scan headmost pixel position of the $129^{th}$ line, the distribution error ERh from the left-adjacent pixel is set to 0. Next, it is judged in Step-107 whether or not K is equal to or smaller than 1. As shown in FIG. 21, since L=7168 in this case, the sep-type variable K of the PE0 is K=0, and the flow for the PE0 advances to Step-1082.

In Step-1082, ERv=ERRO'[i]/4+ERRBE[i]/4+ ERRBO [i]/4 is calculated.

Here, since the sep-type variable i concerning the PE0 is set to i=0 in Step-1170, ERv=ERRBO'[0]/4+ERRBE[0]/4+ ERRBO[0]/4 is substituted.

Here, symbol ERRBO'[0] corresponds to the sep-type variable ERRBO[0] that the PE127 has as the PE left-adjacent to the PE0. In case of BLK=0, the PE0 processes the main-scan headmost pixel, whereby ERRBO'[0]=0 is substituted. Moreover, symbol ERRBE[0] indicates the binarization error occurred from the pixel at the position B0 in FIG. 23, and this is the binarization error occurred at the pixel position where the PE0 processed in case of L=254. The binarization error ERRBE[0] is set in Step-1160. Moreover, symbol ERRBO[0] indicates the binarization error occurred from the pixel at the position B1 in FIG. 23, and this is the binarization error occurred at the pixel position where the PE0 processed in case of L=255. The binarization error ERRBO[0] is set in Step-1170. Hereinafter, the flow is repeated in the same manner.

Here, the distribution of the binarization error of the pixel other than the main-scan headmost pixel in case of BND=1 and BLK 0 will be explained by taking the case of L=7169 as an example. In case of L=7169, the flow advances to Step-103, Step-104, Step-1060 and then Step-1061, and the ERh is calculated. Likewise, each PE performs the calculation process by referring to the sep-type variable ERRE[0] of the same PE in which the binarization error occurred when the even-numbered pixel position was processed has been stored. Then, the flow advances to Step-107, and the sep-type variable K of the PE0 is 1 at this time, whereby the flow for the PE0 advances from Step-107 to Step-108, and further to Step-1081 because L=7169. In Step-1081, ERv=ERRBE[0]/4+ERRBO[0]/4+ERRBE"[0]/4 is calculated.

Here, symbol ERRBE[0] indicates the binarization error occurred from the pixel at the position B0 in FIG. 23, and this is the binarization error occurred at the pixel position where the PE0 processed in case of L=254. This has been set in ERRBE[0] in Step-1160. Moreover, symbol ERRBO[0] indicates the binarization error occurred from the pixel at the position B1 in FIG. 23, and this is the binarization error occurred at the pixel position where the PE0 processed in case of L=255. This has been set in ERRBO[0] in Step-1170. Moreover, symbol ERRBE"[0] indicates the binarization error occurred from the pixel at the position B2 in FIG. 23, and this is the binarization error occurred at the pixel position where the PE1 processed in case of L=256. This has been set in ERRBO[0] in Step-1160. As above, the ERv calculated here is the summation of the binarization errors distributed from the three pixels at the pixel positions 1, 2 and 3 in FIG. 16B.

Likewise, with respect to each pixel of the main-scan headmost line of BND=1 to 38 shown in FIG. 23, the summation of the binarization errors distributed from the three pixels at the pixel positions 1, 2 and 3 in FIG. 16B is calculated as ERv by referring to the sep-type variable ERRBE[i] or ERRBO[i] (stored in Step-1160 or Step-1170) in which the binarization error occurred when the main-scan last line of the one-above BND.

Then, the process is repeated, and the flow ends in Step-127 if L reaches L=279806. Moreover, in this case, the binarization process of the original image data shown in FIG. 23 ends as a whole.

As explained above, if the binarization process of the original image data ends, the binarization process of the 7168×4992 pixels corresponding to one A4 original image ends, and the binarization result is stored in the working memory 216.

Figure 24:
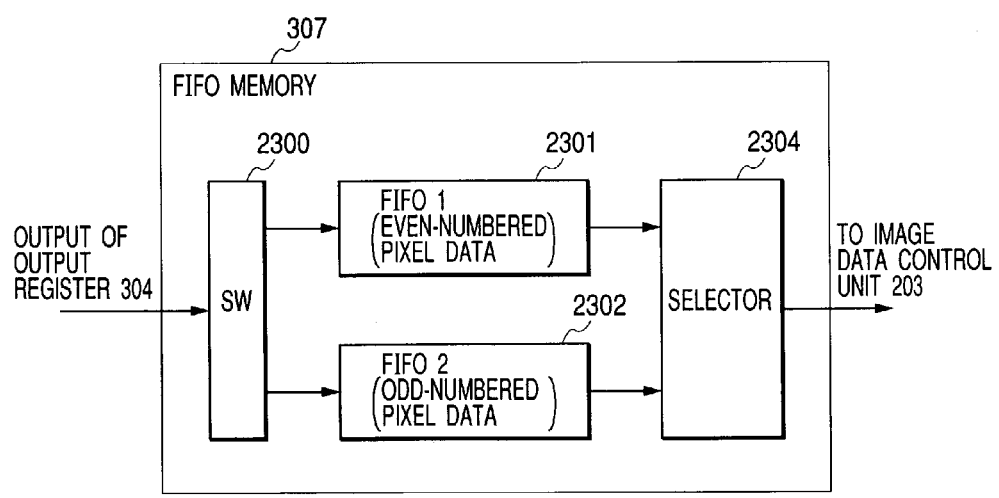
FIG. 24 is a block diagram showing the structure of an FIFO memory 307.

The binarized data stored in the working memory 216 is input from the line address 0 of the working memory to the output register 304 through the external memory I/F 306 of the calculation processing unit 300 shown in FIG. 3 with respect to every 128 pixels. Next, the binarized data read from the working memory 216 is written from the output register 304 to the FIFO memory 307. FIG. 24 is a block diagram showing the FIFO memory 307. In FIG. 24, numeral 2300 denotes a switch (selector) which divides the signal output from the output register 304 into the image (pixel) data of the even-numbered pixels and the image (pixel) data of the odd-numbered pixels, numeral 2301 denotes an FIFO 1 memory to which the image data of the even-numbered pixels output from the selector 2300 are input, numeral 2302 denotes an FIFO 2 memory to which the image data of the odd-numbered pixels output from the selector 2300 are input, and numeral 2304 denotes a selector which outputs either the input data from the FIFO 1 memory 2301 or the input data from the FIFO 2 memory 2302. Here, it should be noted that the FIFO 1 memory 2301 and the FIFO 2 memory 2302 are the line memories each having a capacity of ½ line (3584 pixels). The selector 2304 alternately switches the two input signals for each pixel and then outputs it to the image data control unit 203. Then, the operation of the FIFO memory 307 shown in FIG. 24 will be explained with reference to FIG. 25.

Figure 25:
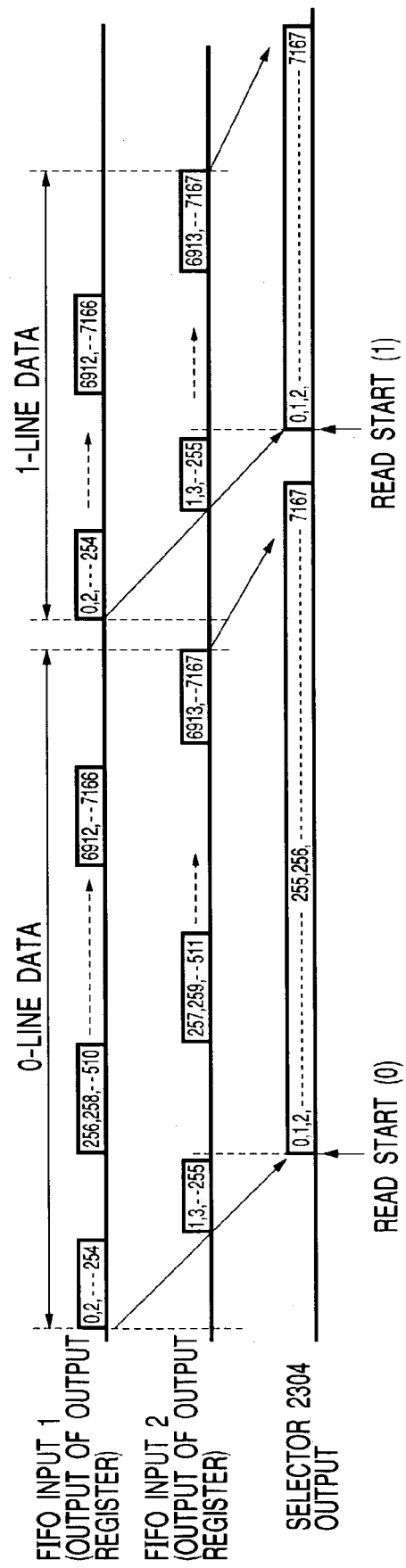
FIG. 25 is a timing chart for explaining the operation of the FIFO memory 307.

In synchronism with the clock output from the calculating processing unit 300, the image data output from the output register 304 is written in the FIFO 1 memory 2301 and the FIFO 2 memory 2302 with respect to every 128 pixels. A read clock is the clock synchronous with the operation of the image formation unit 205. In the present embodiment, the write and read clocks to the FIFO 1 memory 2301 and the FIFO 2 memory 2302 are respectively set to 100 MHz and 20 MHz so that the write clock is faster than the read clock. The output signal from the output register 304 is first connected to the FIFO 1 memory 2301 through the switch 2300, and the data of the $0^{th}$ to $254^{th}$ pixels (128 pixels) are written in the FIFO 1 memory 2301. Then, the signal is switched by the switch 2300, whereby the data of the $1^{st}$ to $255^{th}$ pixels (128 pixels) are written in the FIFO 2 memory 2302. After then, the switching is performed with respect to every 128 pixels, the binarized data at the even-numbered pixel position of the $0^{th}$ line is written in the FIFO 1 memory 2301, while the binarized data at the odd-numbered pixel position is written in the FIFO 2 memory 2302. If the writing of the binarized data of the $255^{th}$ pixel in the FIFO 2 memory 2302 ends, then the reading of the image data of the $0^{th}$ pixel starts in response to the clock synchronous with the operation of the image forming unit 205 at read start timing (0). As shown in FIG. 25, with respect to the reading of the binarized data from the FIFO 1 memory 2301 and the FIFO 2 memory 2301, the binarized image data output from the selector 2304 becomes the continuous data 0, 1, 2, ..., 7167 with respect to each line by alternately changing the reading operations from the FIFO 1 memory 2301 and the FIFO 2 memory 2301. After then, by repeating this, the binarized data of the 7168 line are output from the selector 2304 to the image data control unit 203.

As above, the binarized data read from the FIFO memory 307 is input to the image formation unit (engine) 205, whereby the print process according to the data input to the image formation unit 205 is performed.

Thus, the A4 original image data read by the reading unit 201 is binarized, whereby the print output can be obtained.

Moreover, if the operation clock of the image processor is sufficiently fast as compared with the image clock speed input from the reading unit 201 to the image processor 204 so that the real-time process can be achieved, it is possible to perform the binarization process of the image data read and input by the reading unit 201 without storing it in the working memory 216. In this case, it is possible to adopt the structure that the image data input from the input register 302 of FIG. 3 is captured in the internal memory 411 of the data calculation processing unit 303, the content of the internal memory at the pixel position where the binarization process has ended is written by the binary data, and the binarized data in the internal memory is output to the image forming unit 205 through the output register from the time point when the binarization process of one band shown in FIG. 12 ends.

Otherwise, it is possible to provide on the working memory 216 the area on which the image data of a predetermined lines (128 lines or more) read by the reading unit 201 are stored and the area on which the binarized data of the predetermined lines are stored, and then perform the binarization process to the A4 original image data entirely as updating the image data to be stored on both the areas. However, in this case, the transfer destination address of the working memory to which the binarization result in the internal memory is transferred in Step-121 of FIG. 20B is different from the area on which the corresponding input image data have been stored, but is the area on which the binarized data of the predetermined lines are stored.

Figure 26:
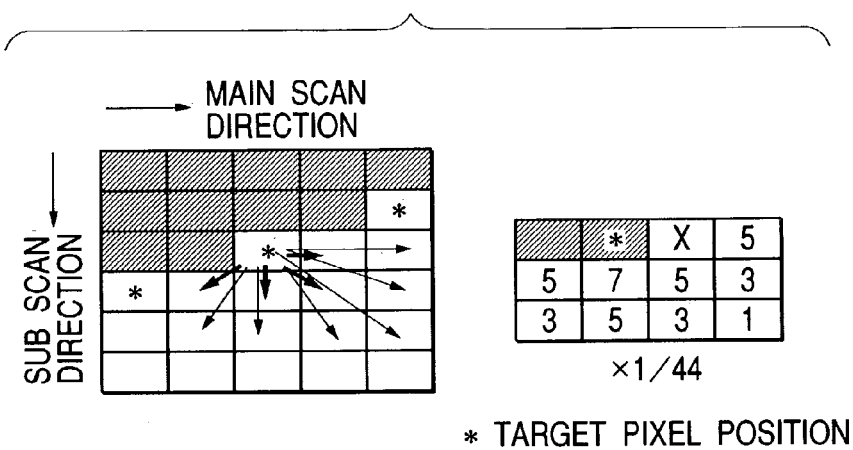
FIG. 26 is a diagram showing a distribution method of binarization errors.

Moreover, although the error data in the error diffusion process according to the present embodiment is distributed to the adjacent four pixels shown in FIGS. 16A and 16B, the error diffusion method is not limited to this. That is, it is apparent that also a method as taught by FIG. 26 is applicable. FIG. 26 shows an example that the error is distributed to ten pixels, and also shows examples of error distribution rates to each pixel position. However, it is of course apparent that these examples are not limited to those shown in FIG. 26. Here, it should be noted that, in FIG. 26, symbol * indicates the target pixel positions that the respective PE's intend to process simultaneously. If the error is distributed to about ten pixels adjacent to the target pixel position (not including the pixel at the target pixel position itself), a satisfactory image can be obtained.

Moreover, it should be noted that symbol X indicates the pixel position that the calculation error occurred in the calculation for distributing the error is absorbed, and the remainder error obtained by subtracting the summation of the distribution errors to other pixels from the summation of the errors is allocated to that position. Moreover, although the 56 (28×2) variables of each PE, i.e., the sep-type variables ERRBE[0] to ERRBE[27] and ERRBO[0] to ERRBO[27] for the error distribution in the BND, are provided in the error distribution shown in FIGS. 16A and 16B, the 112 (56×2) variables become necessary when the error is distributed according to the pattern shown in FIG. 26.

Moreover, the arbitrary pixel position to which a number larger than that of the target pixel position has been added as shown in FIG. 23 indicates the pixel position to which the binarization process is performed after the binarization process to the target pixel ended, and it is apparent that the error can be distributed to this pixel position.

Besides, in the present embodiment, although the process to divide the main-scan original image data input from the $0^{th}$ pixel in due order into the odd-numbered data and the even-numbered data is performed by the FIFO memory 301 shown in FIG. 17, a means for dividing the original image data into the odd-numbered data and the even-numbered data is not limited to this. For example, it is possible to input the original image data to the working memory 216 in the form as shown in FIG. 7 explained in the first embodiment, and divide the original image data into the odd-numbered data and the even-numbered data when the original image data is transferred from the working memory 216 to the internal memory 411.

Otherwise, it is possible to perform the data transfer from the working memory 216 to the internal memory 411 from the $0^{th}$ pixel in due order, and divide the original image data into the odd-numbered data and the even-numbered data by handling the content of the internal memory 411 after the data was transferred to the internal memory 411.

Otherwise, it is possible to perform the data transfer from the working memory 216 to the internal memory 411 from the $0^{th}$ pixel in due order, and divide the original image data into the odd-numbered data and the even-numbered data when each PE accesses the internal memory 411.

Moreover, it is possible to change the arrangement of the original image data stored in the form of FIG. 7 in the working memory 216 into the arrangements of the odd-numbered data and the even-numbered data by handling the content of the working memory 216, and form the changed arrangements of the original image data in the working memory 216.

Likewise, the means for converting the binarization-processed results of the divided odd-numbered and even-numbered original image data into the continuous arrangement data is not limited to the means based on the FIFO memory 307 shown in FIG. 24. For example, it is possible to convert the binarization-processed results of the divided odd-numbered and even-numbered original image data into the continuous arrangement data when the binarization-processed result is transferred from the internal memory 411 to the working memory 216. Otherwise, it is possible to form the continuous arrangement data in the internal memory 411 and then transfer the formed data to the working memory 216 by handling the content of the internal memory 411. Moreover, each PE may write the binarization results of the divided odd-numbered and even-numbered original image data in the internal memory 411 to obtain the continuous data arrangement.

Otherwise, it is possible to change the binarization results of the divided odd-numbered and even-numbered original image data transferred to the working memory 216 into the continuous arrangement data and then form the obtained arrangement in the working memory 216, by handing the content of the working memory 216.

Thus, according to the second embodiment, in addition to the effect obtained in the first embodiment, it is possible to diffuse the error to the pixel position which is the lower left oblique position (FIG. 16A) adjacent to the target pixel and to which the error diffusion is impossible in the first embodiment. Thus, unnatural texture appeared in the image data after the error diffusion process was performed can be controlled, whereby it is possible to increase image quality.

Third Embodiment

In the third embodiment, an error is distributed or diffused to 12 pixels on the periphery of a target pixel to obtain an image of higher quality.

Figure 27:
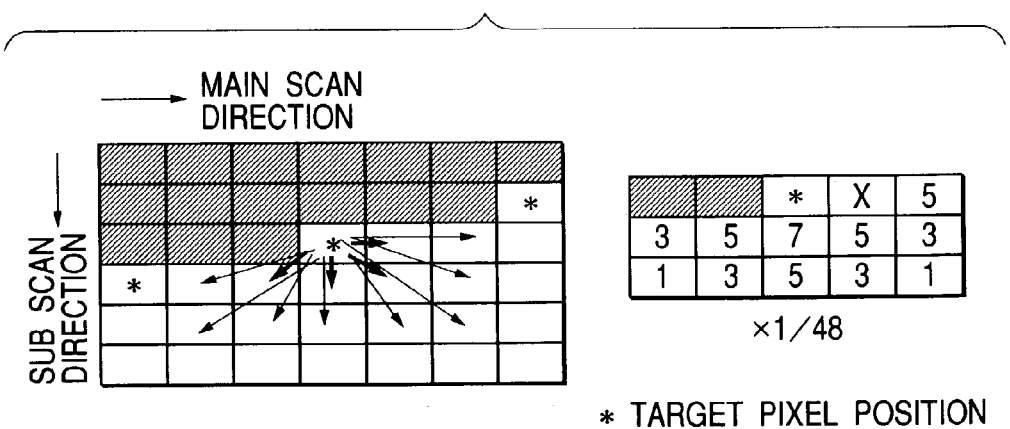
FIG. 27 is a diagram showing a distribution method of binarization errors in the third embodiment.

FIG. 27 shows an example of error distribution directions and error distribution rates. In FIG. 27, symbol * indicates the target pixel positions that the respective PE's intend to process simultaneously, and the error is distributed to about the 12 pixels adjacent to the target pixel position (not including the pixel at the target pixel position itself). Incidentally, symbol X indicates the pixel position that the calculation error occurred in the calculation for distributing the error is absorbed, and the remainder error obtained by subtracting the summation of the distribution errors to other pixels from the summation of the errors is allocated to that position.

Although each PE handles the two pixels continuous in the main scan direction in the second embodiment, each PE handles the three pixels continuous in the main scan direction in the third embodiment.

The relation of the original image data stored in the working memory and the addresses of the working memory according to the third embodiment is shown in FIG. 28. As shown in FIG. 28, the pixel position data of a multiple of 3 in the main scan direction, the pixel position data of the multiple of 3 plus 1, and the pixel position data of the multiple of 3 plus 2 are sequentially stored with respect to the every 128 pixels in the working memory 216. In the present embodiment, the example that the number of pixels in the main scan direction is 7196 pixels is shown.

In the present embodiment, as well as the first and second embodiments, the original image data of the every 128 pixels are transferred from the address 0 of the working memory shown in FIG. 28 to the internal memory 411 of the data calculation processing unit 303 in due order, and the image data transferred to the internal memory are binarized in parallel by the respective PE's.

Incidentally, it should be noted that, since the detailed process flow in the present embodiment can be easily analogized from the explanations of the first and second embodiments, the detailed explanation of the operation in the present embodiment is omitted.

Figure 29:
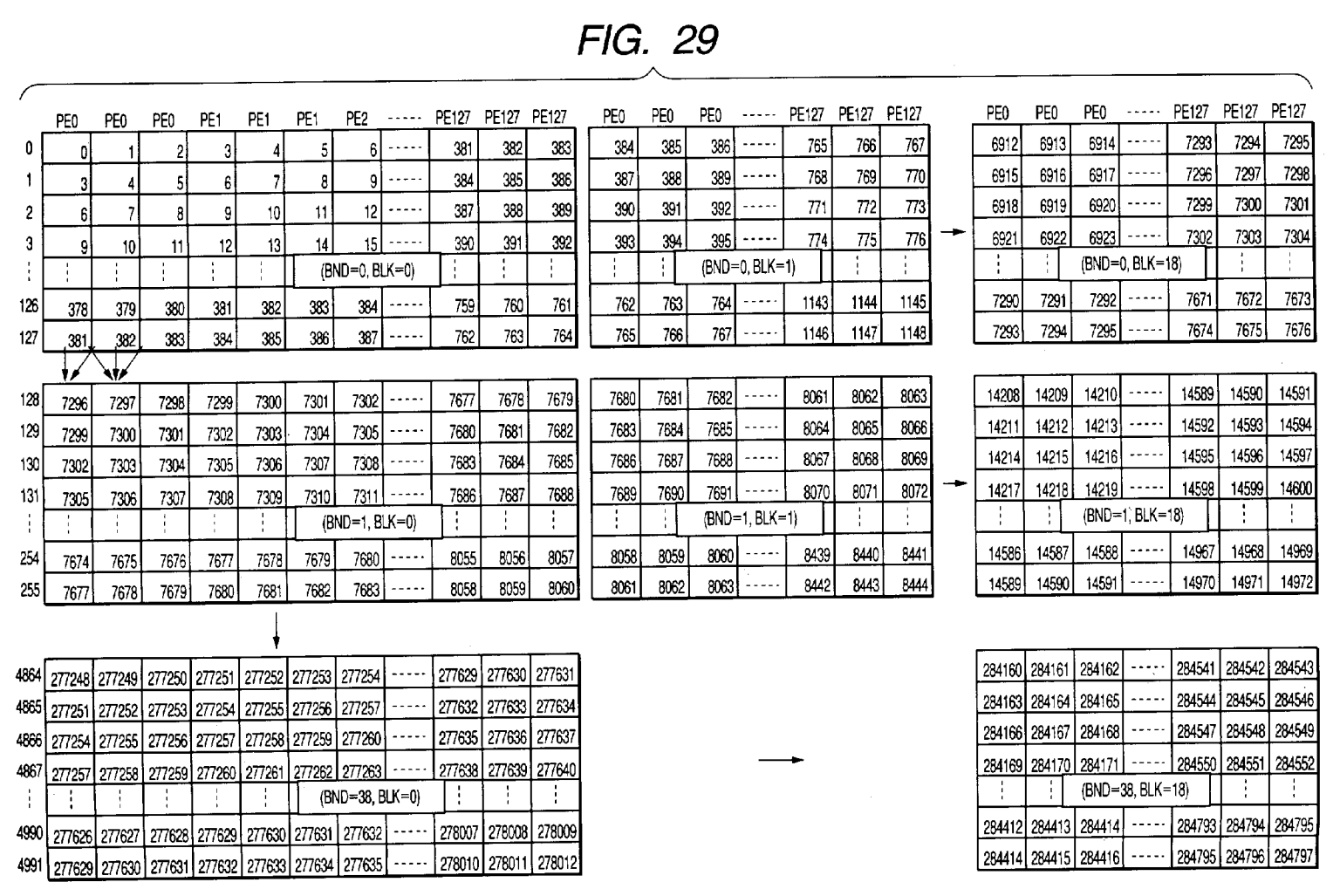

FIG. 29 shows the order of a binarization process of A4 original image data consisting of main-scan 7296 pixels and sub-scan 4992 lines, pixel positions of which the processes are handled by respective PE's, and the order of the processes to the respective pixel positions. As shown in FIG. 29, the order of the binarization processes of the 12 pixel areas, on the periphery of the target pixel, to which the binarization errors shown in FIG. 27 are distributed is later than the order of the binarization process to the target pixel, whereby it can be understood that the binarization errors shown in FIG. 27 are distributed.

Moreover, in the present embodiment, each PE handles the three pixels continuous in the main scan direction. However, the present invention is not limited to this, that is, each PE may handle the four or five continuous pixels.

That is, by increasing the number of continuous (or successive) pixels in the main scan direction to be handled by each PE, the binarization error can be distributed to pixel positions of a wider range.

As described above, according to the present embodiment, as compared with the error diffusion area in the second embodiment, it is possible to achieve the error diffusion to the pixel position former by the two pixels in the main scan direction on the line adjacent to the target pixel in the sub scan direction. Thus, a symmetric property of the error diffusion areas can be improved, and the texture appeared in the image data after the error diffusion process was performed can be improved, whereby it is possible to increase image quality.

Other Embodiment

The above embodiments of the present invention are explained, as an example, for the error diffusion process of binarizing the input image data. However, it is apparent that the present invention is not limited to the binarization process, but is applicable to a multivalued error diffusion process such as a three-valued process, a four-valued process or the like.

Moreover, the image process to which the present invention is applied is not limited to the error diffusion process. That is, it is apparent that the present invention is applicable not only to a modified method according to various error diffusion methods but also to a so-called sequential process of processing a target pixel by using previous processed results.

Moreover, it is needless to say that the object of the above embodiments can be achieved in a case where a storage medium (or a recording medium) storing program codes of software to realize the functions of the above embodiments is supplied to a system or an apparatus and then a computer (or CPU or MPU) in the system or the apparatus reads and executes the program codes stored in the storage medium. In this case, the program codes themselves read from the storage medium realize the functions of the above embodiments, whereby the storage medium storing these program codes constitutes the present invention. Moreover, it is needless to say that the present invention also includes not only a case where the functions of the above embodiments are realized by executing the program codes read by the computer, but also a case where an OS (operating system) or the like functioning on the computer executes a part or all of the actual process according to the instructions of the program codes, whereby the functions of the above embodiments are achieved by that process.

Moreover, it is needless to say that the present invention includes a case where the program codes read from the storage medium are once written in a memory provided in a function expansion card inserted in the computer or a function expansion unit connected to the computer, and then a CPU or the like provided in the function expansion card or the function expansion unit executes a part or all of the actual process according to the instructions of the program codes, whereby the functions of the above embodiments are achieved by that process.

As explained above, according to the present invention, it is possible to perform the image process such as the error diffusion process of the like by using the SIMD processor without using any auxiliary processor for the sequential process. Moreover, it is possible to perform the sequential process as effectively operating the plural processing units included in the SIMD processor even if the number of pixels of the input image data of one line obtained by raster scan is equal to or larger than the number of the processing units included in the SIMD processor.

Moreover, it is possible to distribute or diffuse the binarization error to the pixel position suitable for improving image quality, whereby a high-quality image can be obtained.

As many apparently widely different embodiments of the present invention can be made without departing from the spirit and scope thereof, it is to be understood that the invention is not limited to the specific embodiments thereof expect as defined in the appended claims.

What is claimed is:

1. An image processing apparatus which processes input image data of Y lines, each line consisting of X pixels, by using an SIMD (Single Instruction stream Multiple Data stream) processor, comprising:
    calculation means including N (X>N>1, Y>N>1) elemental processors capable of operating in parallel;
    input means for dividing the image data of one line with respect to every N pixels and inputting the divided image data;
    storage means for storing the divided and input N-pixel image data of the N lines; and
    image processing means for supplying, from among the N-pixel image data of the N lines stored in said storage means, the N image data respectively to the N elemental processors of said calculation means, and causing the respective elemental processors to perform the calculations of the same kind in parallel,
    wherein said image processing means causes the respective elemental processors to execute in parallel the calculations of the input image data of different lines and different positions of a main scan line, from among the N image data respectively supplied to the N elemental processors.

2. An image processing apparatus according to claim 1, wherein said image processing means for causing said N elemental processors to perform the calculations in parallel performs an error diffusion process.

3. An image processing apparatus according to claim 2, wherein said calculation means including said N elemental processors further includes means for calculating a quantization error generated in the error diffusion process as an error value with respect to every N elemental processors, and
    each of said elemental processors processes the image data input to said elemental processor based on the error value calculated for the adjacent elemental processor.

4. An image processing apparatus according to claim 2, wherein said calculation means including said N elemental processors further includes means for calculating a quantization error generated in the error diffusion process as an error value with respect to every N elemental processors, and
    each of said elemental processors processes the image data input to said elemental processor based on the error value calculated for said elemental processor at least immediately before.

5. An image processing apparatus according to claim 2, wherein, in a case where the number of blocks obtained by dividing the X pixels constituting one line with respect to every N pixels is assumed to be BLK, said calculation means including said N elemental processors includes at least BLK×N error storage means.

6. An image processing apparatus according to claim 5, wherein, in a case where the number of bands obtained by dividing the input image data of the Y lines with respect to every N lines is assumed to be BND, the error data stored in said at least BLK×N error storage means are used to process the image data belonging to different BND.

7. An image processing method which processes input image data of Y lines, each line consisting of X pixels, by using an SIMD processor, said method comprising:
    a calculation step of performing calculation by using N (X>N>1, Y>N>1) elemental processors capable of operating in parallel;
    an input step of dividing the image data of one line with respect to every N pixels and inputting the divided image data;
    a storage step of storing the divided and input N-pixel image data of the N lines; and
    an image processing step of supplying, from among the N-pixel image data of the N lines stored in said storage step, the N image data respectively to the N elemental processors, and causing the respective elemental processors to perform the calculations of the same kind in parallel,
    wherein said image processing step causes the respective elemental processors to execute in parallel the calculations of the input image data of different lines and different positions of a main scan line, from among the N image data respectively supplied to the N elemental processors.

8. An image processing method according to claim 7, wherein said image processing step of performing the calculations in parallel by using the N elemental processors performs an error diffusion process.

9. An image processing method according to claim 8, wherein said calculation step of performing the calculations by using the N elemental processors further includes a step of causing every N elemental processors to calculate a quantization error generated in the error diffusion process as an error value, and
said calculation step causes each of the elemental processors to process the image data input based on the error value calculated by the adjacent elemental processor.

10. An image processing method according to claim 8, wherein said calculation step of performing the calculations by using the N elemental processors further includes a step of causing every N elemental processors to calculate a quantization error generated in the error diffusion process as an error value, and
said calculation step causes each of the elemental processors to process the image data input based on the error value calculated by said elemental processor at least immediately before.

11. An image processing method according to claim 8, wherein, in a case where the number of blocks obtained by dividing the X pixels constituting one line with respect to every N pixels is assumed to be BLK, said calculation step of performing the calculations by using the N elemental processors includes an error storage step of storing at least BLK×N errors.

12. An image processing method according to claim 11, wherein, in a case where the number of bands obtained by dividing the input image data of the Y lines with respect to every N lines is assumed to be BND, at least the BLK×N error data stored in said storage step are used to process the image data belonging to different BND.

13. A recording medium which stores thereon a control program to cause a computer to execute an image processing method of processing input image data of Y lines, each line consisting of X pixels, by using an SIMD (Single Instruction stream Multiple Data stream) processor, said method comprising:
a calculation step of performing calculation by using N (X>N>1, Y>N>1) elemental processors capable of operating in parallel;
an input step of dividing the image data of one line with respect to every N pixels and inputting the divided image data;
a storage step of storing the divided and input N-pixel image data of the N lines; and
an image processing step of supplying, from among the N-pixel image data of the N lines stored in said storage step, the N image data respectively to the N elemental processors, and causing the respective elemental processors to perform the calculations of the same kind in parallel,
wherein said image processing step causes the respective elemental processors to execute in parallel the calculations of the input image data of different lines and different positions of a main scan line, from among the N image data respectively supplied to the N elemental processors.

14. An image processing apparatus which processes input image data of Y lines, each line consisting of X pixels, by using an SIMD processor, comprising:
calculation means including N (X>N>1, Y>N>1) elemental processors capable of operating in parallel;
input means for dividing the image data of one line with respect to every N pixels and inputting the divided image data;
storage means for storing the divided and input N-pixel image data of the N×M (M is natural number) lines; and
image processing means for supplying, from among the N-pixel image data of the M lines stored in said storage means, the N image data respectively to the N elemental processors of said calculation means, and causing the respective elemental processors to perform the calculations of the same kind in parallel,
wherein said image processing means causes the respective elemental processors to execute in parallel the calculations of the input image data of different lines and different positions of a main scan line, from among the N image data respectively supplied to the N elemental processors.

15. An image processing apparatus according to claim 14, wherein each of said N elemental processors processes the image data of the plural continuous pixels in one line.

16. An image processing apparatus according to claim 14, wherein said input means divides the image data of one line into the N-pixel image data at odd-numbered pixel positions in one line and the N-pixel image data at even-numbered pixel positions, and inputs the divided image data.

17. An image processing apparatus according to claim 14, wherein said image processing means for causing said N elemental processors to perform the calculations in parallel performs an error diffusion process.

18. An image processing apparatus according to claim 17, wherein said calculation means including said N elemental processors further includes means for calculating a quantization error generated in the error diffusion process as an error value with respect to every N elemental processors, and
each of said elemental processors processes the image data input to said elemental processor based on the error value calculated for the adjacent elemental processor.

19. An image processing apparatus according to claim 17, wherein said calculation means including said N elemental processors further includes means for calculating a quantization error generated in the error diffusion process as an error value with respect to every N elemental processors, and
each of said elemental processors processes the image data input to said elemental processor based on the error value calculated for said elemental processor at least immediately before.

20. An image processing apparatus according to claim 17, wherein, in a case where the number of blocks obtained by dividing the X pixels constituting one line with respect to every N×M pixels is assumed to be BLK, said calculation means including said N elemental processors includes at least BLK×N×M error storage means.

21. An image processing apparatus according to claim 20, wherein, in a case where the number of bands obtained by dividing the input image data of the Y lines with respect to every N lines is assumed to be BND, the error data stored in said at least BLK×N×M error storage means are used to process the image data belonging to different BND.

22. An image processing apparatus according to claim 14, wherein each of said N elemental processors processes the image data of the M pixels continuous in a line direction of the one-line input image data.

23. An image processing method which processes input image data of Y lines, each line consisting of X pixels, by using an SIMD processor, said method comprising:
- a calculation step of performing calculation by using N (X>N>1, Y>N>1) elemental processors capable of operating in parallel;
- an input step of dividing the image data of one line with respect to every N pixels and inputting the divided image data;
- a storage step of storing the divided and input N-pixel image data of the N×M (M is natural number) lines; and
- an image processing step of supplying, from among the N-pixel image data of the M lines stored in said storage step, the N image data respectively to the N elemental processors, and causing the respective elemental processors to perform the calculations of the same kind in parallel,
- wherein said image processing step causes the respective elemental processors to execute in parallel the calculations of the input image data of different lines and different positions of a main scan line, from among the N image data respectively supplied to the N elemental processors.

24. An image processing method according to claim 23, wherein each of the N elemental processors processes the image data of the plural continuous pixels in one line.

25. An image processing method according to claim 23, wherein said input step divides the image data of one line into the N-pixel image data at odd-numbered pixel positions in one line and the N-pixel image data at even-numbered pixel positions, and inputs the divided image data.

26. An image processing method according to claim 23, wherein said image processing step of causing the N elemental processors to perform the calculations in parallel performs an error diffusion process.

27. An image processing method according to claim 26, wherein said calculation step of performing the calculations by using the N elemental processors further includes a step of calculating a quantization error generated in the error diffusion process as an error value with respect to every N elemental processors, and
- each of the elemental processors processes the image data input to said elemental processor based on the error value calculated by the adjacent elemental processor.

28. An image processing method according to claim 26, wherein said calculation step of performing the calculations by using the N elemental processors further includes a step of calculating a quantization error generated in the error diffusion process as an error value with respect to every N elemental processors, and
- each of the elemental processors processes the image data input to said elemental processor based on the error value calculated by said elemental processor at least immediately before.

29. An image processing method according to claim 26, wherein, in a case where the number of blocks obtained by dividing the X pixels constituting one line with respect to every N×M pixels is assumed to be BLK, said calculation step of performing the calculations by using the N elemental processors includes an error storage step of storing at least BLK×N×M errors.

30. An image processing method according to claim 29, wherein, in a case where the number of bands obtained by dividing the input image data of the Y lines with respect to every N lines is assumed to be BND, at least the BLK×N×M error data stored in said error storage step are used to process the image data belonging to different BND.

31. A recording medium which stores thereon a control program to cause a computer to execute an image processing method of processing input image data of Y lines, each line consisting of X pixels, by using an SIMD processor, said method comprising:
- a calculation step of performing calculation by using N (X>N>1, Y>N>1) elemental processors capable of operating in parallel;
- an input step of dividing the image data of one line with respect to every N pixels and inputting the divided image data;
- a storage step of storing the divided and input N-pixel image data of the N×M (M is natural number) lines; and
- an image processing step of supplying, from among the N-pixel image data of the M lines stored in said storage step, the N image data respectively to the N elemental processors, and causing the respective elemental processors to perform the calculations of the same kind in parallel,
- wherein said image processing step causes the respective elemental processors to execute in parallel the calculations of the input image data of different lines and different positions of a main scan line, from among the N image data respectively supplied to the N elemental processors.

* * * * *

UNITED STATES PATENT AND TRADEMARK OFFICE
CERTIFICATE OF CORRECTION

PATENT NO. : 7,053,895 B2
APPLICATION NO. : 10/331550
DATED : May 30, 2006
INVENTOR(S) : Shigeo Yamagata et al.

It is certified that error appears in the above-identified patent and that said Letters Patent is hereby corrected as shown below:

DRAWINGS:
Sheet 10, Figure 9A, "DRESS INTERNAL MORY 411" should read -- ADDRESS OF INTERNAL MEMORY 411 --.

COLUMN 5:
Line 11, "sill" should read -- will --; and
Line 38, "but" should read -- bus --.

COLUMN 12:
Line 25, "(through" should read -- (though --.

COLUMN 15:
Line 30, "according" should read -- accordingly --.

COLUMN 21:
Line 11, "PENUM 0," should read -- PENUM=0, --.

COLUMN 23:
Lines 7 and 8, "process" should read -- processed --.

COLUMN 24:
Line 33, "than," should read -- then, --.

COLUMN 26:
Line 43, "fro" should read -- for --.

COLUMN 27:
Line 15, "BLK 27," should read -- BLK=27, --.

COLUMN 28:
Line 9, "BLK 0" should read -- BLK=0 --.

COLUMN 30:
Line 6, "termined" should read -- termined number of --.

COLUMN 31:
Line 36, "handing" should read -- handling --.

COLUMN 32:
Line 46, "former" should read -- formed --.

UNITED STATES PATENT AND TRADEMARK OFFICE
CERTIFICATE OF CORRECTION

PATENT NO. : 7,053,895 B2
APPLICATION NO. : 10/331550
DATED : May 30, 2006
INVENTOR(S) : Shigeo Yamagata et al.

It is certified that error appears in the above-identified patent and that said Letters Patent is hereby corrected as shown below:

COLUMN 33:
Line 35, "of" should read -- or --.

Signed and Sealed this

Twenty-second Day of May, 2007

JON W. DUDAS
*Director of the United States Patent and Trademark Office*